US010600442B2

(12) United States Patent
Kobayashi et al.

(10) Patent No.: US 10,600,442 B2
(45) Date of Patent: Mar. 24, 2020

(54) INFORMATION PROCESSING DEVICE, INFORMATION PROCESSING METHOD, AND PROGRAM

(71) Applicant: SONY CORPORATION, Tokyo (JP)

(72) Inventors: Yoshiyuki Kobayashi, Tokyo (JP); Kouichi Uchimura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/762,366

(22) PCT Filed: Oct. 4, 2016

(86) PCT No.: PCT/JP2016/079519
§ 371 (c)(1),
(2) Date: Mar. 22, 2018

(87) PCT Pub. No.: WO2017/068971
PCT Pub. Date: Apr. 27, 2017

(65) Prior Publication Data
US 2018/0277156 A1 Sep. 27, 2018

(30) Foreign Application Priority Data
Oct. 20, 2015 (JP) ................. 2015-206176

(51) Int. Cl.
G11B 20/10 (2006.01)
G11B 7/005 (2006.01)
G11B 20/12 (2006.01)
G11B 7/007 (2006.01)

(52) U.S. Cl.
CPC ........ *G11B 20/10527* (2013.01); *G11B 7/005* (2013.01); *G11B 7/0079* (2013.01); *G11B 20/10* (2013.01); *G11B 20/1217* (2013.01); *G11B 2020/10694* (2013.01)

(58) Field of Classification Search
CPC ..... G11B 20/105; G11B 7/005; G11B 7/0079; G11B 20/10; G11B 20/1217
See application file for complete search history.

(56) References Cited

U.S. PATENT DOCUMENTS

2016/0026820 A1* 1/2016 Kozuka ............ G11B 20/00855
705/57

FOREIGN PATENT DOCUMENTS

JP 2009-252263 A 10/2009
JP 2010-250927 A 11/2010
JP 2010-250939 A 11/2010
(Continued)

Primary Examiner — Mishawn N. Hunter
(74) Attorney, Agent, or Firm — Paratus Law Group, PLLC

(57) ABSTRACT

Data reproduction is performed in a mode decided on the basis of disc type information which is record data of a disc. A reading rate compatible with a physical format of a disc is compared with a reading rate compatible with a disc type, and in a case where the reading rates do not coincide with each other, data read from the disc at the physical format compatible rate is stored in the buffer, and the reproduction process is performed using the data output from the buffer at the disc type compatible rate. In a case where the physical format is BD-R or BD-RE, and the logical format is a logical format compatible with BDMV-UHD, the emulation mode reproduction accompanied with the rate conversion using the buffer is performed.

12 Claims, 13 Drawing Sheets

(56) References Cited

FOREIGN PATENT DOCUMENTS

| | | |
|---|---|---|
| JP | 2011-170921 A | 9/2011 |
| WO | WO 98/07149 A1 | 2/1998 |
| WO | WO 2006/120921 A1 | 11/2006 |

* cited by examiner

FIG. 1

| | (a) DISC CAPACITY | (b) MAXIMUM RECORDING RATE (Maximum MPEG-2 transport stream bitrate) |
|---|---|---|
| (1) | 50GB | 64Mbps |
| (2) | 50GB | 81.7bps |
| (3) | 66GB | 81.7Mbps |
| (4) | 66GB | 109Mbps |
| (5) | 66GB (TWO-ZONE TYPE DISC) | 109Mbps(LTR)／127.9Mbps(HTR) |
| (6) | 100GB | 81.7Mbps |
| (7) | 100GB | 109Mbps |
| (8) | 100GB (TWO-ZONE TYPE DISC) | 109Mbps(LTR)／127.9Mbps(HTR) |

FIG. 2
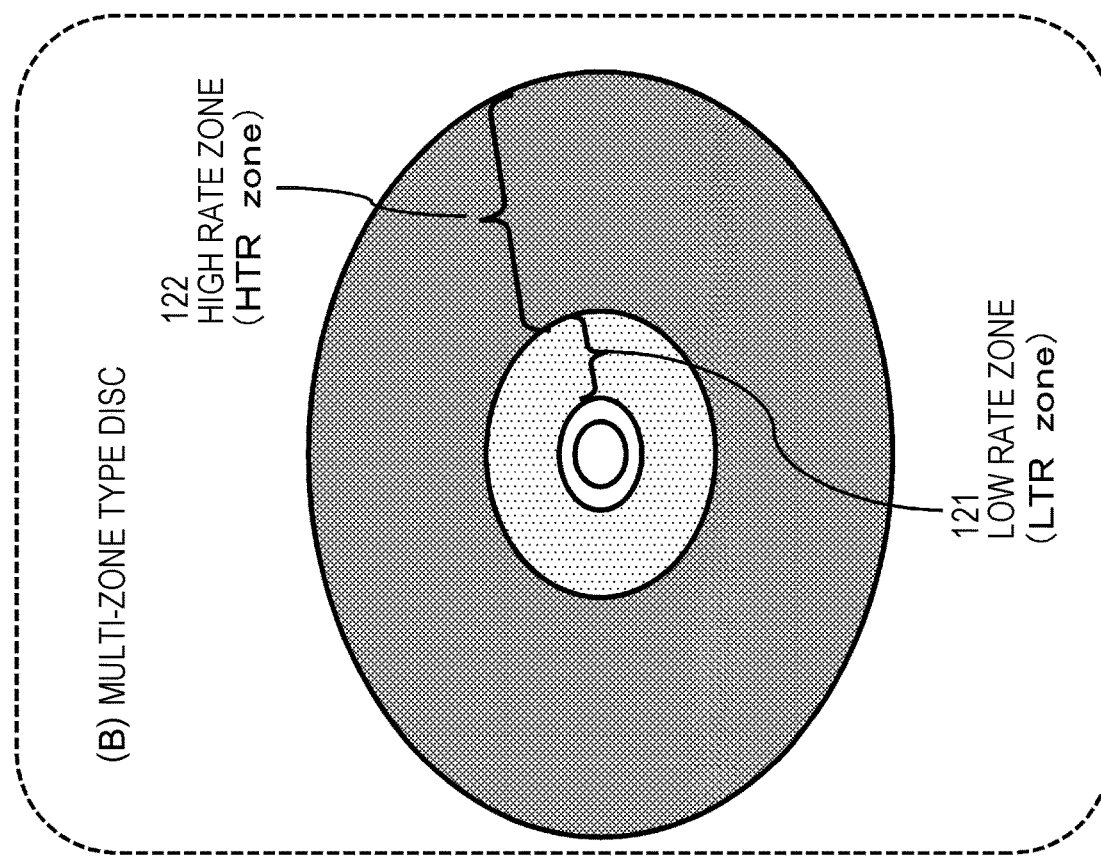
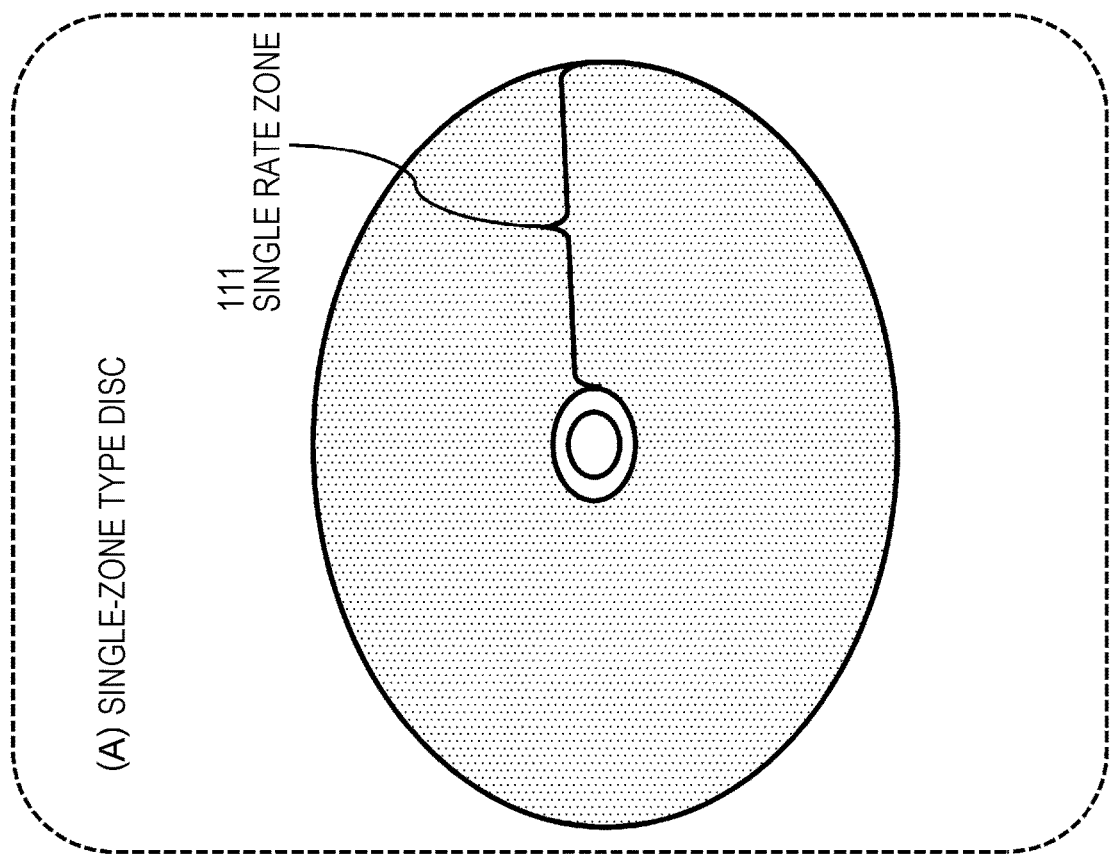

FIG. 5

| | BD-R | | | |
|---|---|---|---|---|
| | SL (FIRST LAYER) | DL (SECOND LAYER) | TL (THIRD LAYER) | QL (FOURTH LAYER) |
| CAPACITY (Capacity) | 25 GB | 50 GB | 100 GB | 128 GB |
| WAVELENGTH OF LD (Wavelength of LD) | 405 nm | | | |
| LENS CHARACTERISTIC (N.A. of objective lens) | 0.85 | | | |
| COVER LAYER CONFIGURATION (Cover Layer thickness) | 100 μm | 100 μm (Layer L0) 75 μm (Layer L1) | 100 μm (Layer L0) 75 μm (Layer L1) 57 μm (Layer L2) | 100 μm (Layer L0) 84.5 μm (Layer L1) 65 μm (Layer L2) 53.5 μm (Layer L3) |
| CAPACITY PER LAYER (Capacity per layer) | 25 GB | 25 GB | 33.3 GB | 32 GB |
| TRACK FORMAT (Track format) | On-Groove | | | |
| ADDRESS METHOD (Address method) | MSK (Minimum-Shift Keying) & STW (Saw-Tooth Wobble) | | | |
| ROTATION (Rotation) | CLV | | | |
| TRACK PITCH (Track Pitch) | 0.32 μm | | | |
| CHANNEL MODULATION (Channel modulation) | 17PP | | | |
| MINIMUM MARK LENGTH (Minimum Mark length) | 149 nm | | 112 nm | 117 nm |
| TOTAL EFFICIENCY (Total efficiency) | 81.7% | | | |
| USER DATA TRANSFER RATE (User Data transfer rate) | 36 – 216 Mbps | | 72 – 144 Mbps | |
| EVALUATION INDEX FOR SIGNAL QUALITY (Evaluation index for signal quality) | Limit Equalizer jitter | | i-MLSE using PR(1,2,2,2,1) | |
| RECORDING SPEED (Write speed for media) | 1x, 2x, 4x (Optional), 6x (Optional) | | | 2x, 4x |

FIG. 6

| | BD-RE Ver.2.1 | | BD-RE Ver.3.0 (BDXL™) |
| --- | --- | --- | --- |
| | SL (FIRST LAYER) | DL (SECOND LAYER) | TL (THIRD LAYER) |
| CAPACITY (Capacity) | 25 GB | 50 GB | 100 GB |
| WAVELENGTH OF LD (Wavelength of LD) | 405 nm | | |
| LENS CHARACTERISTIC (N.A. of objective lens) | 0.85 | | |
| COVER LAYER CONFIGURATION (Cover Layer thickness) | 100 mm | 100 mm (Layer L0)75 mm (Layer L1) | 100 mm (Layer L0),75 mm (Layer L1),57 mm (Layer L2) |
| CAPACITY PER LAYER (Capacity per layer) | 25 GB | 25 GB | 33.4 GB |
| TRACK FORMAT (Track format) | On-Groove | | |
| ADDRESS METHOD (Address method) | MSK & STW | | |
| ROTATION (Rotation) | CLV | | |
| TRACK PITCH (Track Pitch) | 0.32 mm | | |
| CHANNEL MODULATION (Channel modulation) | 17PP | | |
| MINIMUM MARK LENGTH (Minimum Mark length) | 149 nm | | 112 nm |
| TOTAL EFFICIENCY (Total efficiency) | 81.7% | | |
| USER DATA TRANSFER RATE (User Data transfer rate) | 36-72 Mbps | | 72 Mbps |
| EVALUATION INDEX FOR SIGNAL QUALITY (Evaluation index for signal quality) | Limit Equalizer jitter | | i-MLSE using PR(1,2,2,2,1) |
| RECORDING SPEED (Write speed for media) | 1X,2X | | 2X |

FIG. 8

| | PHYSICAL FORMATS | LOGICAL FORMATS |
|---|---|---|
| (1) | BD-UHD-ROM | BDMV-UHD |
| (2) | BD-ROM | BDMV |
| (3) | BD-R | BDMV-UHD |
| (4) | BD-R | BDMV |
| (5) | BD-R | OTHERS (SUCH AS BDAV) |
| (6) | BD-RE | BDMV-UHD |
| (7) | BD-RE | BDMV |
| (8) | BD-RE | OTHERS (SUCH AS BDAV) |
| (9) | OTHERS (SUCH AS DVD) | OTHERS |

FIG. 9
INDEX TABLE Index table (AppInfoBDMV)

| Syntax | Number of bits | Mnemonic |
|---|---|---|
| AppInfoBDMV(){ | | |
| length | 32 | uimsbf |
| reserved | 1 | bslbf |
| initial_out_mode_preference | 1 | bslbf |
| SS_content_exist_flag | 1 | bslbf |
| disc_type | 4 | bslbf |
| video_format | 4 | bslbf |
| frame_rate | 4 | bslbf |
| content_provider_user_data | 8 * 32 | bslbf |
| ... | | |

RECORDING PHYSICAL MEDIUM IDENTIFIER (DISC TYPE)

*FIG. 10*

| | (a) DISC TYPE (disc_type) | (b) CAPACITY (GB) | (c) ZONE SETTING | (d) READING BIT RATE (Mbps) | (e) MAXIMUM RECORDING RATE (Mbps) |
|---|---|---|---|---|---|
| (1) | 0010b | 50GB | SINGLE ZONE | 71.9Mbps | 64Mbps |
| (2) | 0011b | 50GB | SINGLE ZONE | 91.9Mbps | 81.7Mbps |
| (3) | 0100b | 66/100GB | SINGLE ZONE | 91.9Mbps | 81.7Mbps |
| (4) | 0101b | 66/100GB | LTR | 122.5Mbps | 109Mbps |
| (5) | 0110b | 66/100GB | HTR | 143.9Mbps | 127.9Mbps |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/079519 (filed on Oct. 4, 2016) under 35 U.S.C. § 371, which claims priority to Japanese Patent Application No. 2015-206176 (filed on Oct. 20, 2015), which are all hereby incorporated by reference in their entirety.

TECHNICAL FIELD

The present disclosure relates to an information processing device, an information processing method, and a program, More particularly, the present disclosure relates to an in formation processing device, an information processing method, and a program which are capable of executing reproduction of content including an ultra high definition (UHD) image recorded in a rewritable disc.

BACKGROUND ART

Digital versatile discs (DVD) or Blu-ray (a registered trademark) discs (BDs) are widely used as an information recording medium for recording a variety of content such as movies or music.

Data such as audios and subtitles is recorded in a BD-ROM which is a medium having content such as movies recorded therein in advance together with, for example, a high definition (HD) image which is a high quality image.

HD images, so-called high-definition-compatible 2K images, are usually recorded in most of current BD-ROMs, but as the image quality is improved, mediums having an ultra high definition (UHD) image recorded therein are expected to increase in the future.

Further, high resolution images such as 4K images or 8K images are representative examples of the ultra high definition image (UHD image), but the ultra high definition image is not limited to the high resolution image, and wide dynamic: range images, images having a wide output color space, and the like are also called the UHD images.

In the future, mediums having a UHD image recorded therein are expected to increase.

For example, the ultra high definition images (UHD images) such as 4K images are larger in a processed data amount per unit time than 2K images which are the HD images. As a result, it is necessary to increase a data recording density or a data reading rate for discs such as BDs as well.

A data recording form of the ultra high definition image (UHD image) for the BD is currently being standardized in Blu-ray (a registered trademark) Disc Association (BDA) which is a standardization organization.

For a BD-DHD-ROM disc which is a BD-ROM disc having UHD content including a UHD image recorded therein, standards of various types of discs such as a multi-layer type disc having two or more recording layers in addition to a single layer type disc having a single data recording layer are under discussion.

The BD-UHD-ROM has a unique physical format different from those of the existing BD-ROMs. For example, the BD-UHD-ROM is a disc having a unique physical format in which a data recording capacity per disc layer and a reading bit rate are different from those of existing BD-ROM discs.

Further, a logical format in which a type, an arrangement, and the like of data files recorded in the BD-UHD-ROM disc is also a unique logical format different from those of the existing BD-ROMs.

In a case where the BD-UHD-ROM disc having content such as movies recorded therein is manufactured, it is necessary to perform a reproduction test of whether or not content recorded in the disc is normally reproduced.

After normal reproduction is confirmed in the reproduction test, mass production of the ROM disc is performed.

However, for example, in order to manufacture the BD-UHD-ROM disc having a certain UHD content recorded therein, it is necessary to manufacture a mold and stamper specific to content, and thus there is a problem in that it takes a time and cost.

In this regard, the UHD content scheduled to be recorded in the BD-UHD-ROM disc is written in a BD-R disc, a BD-RE disc, or the like which is a data rewritable disc, and a reproduction test of whether or not the UHD content is reproduced normally using the data rewritable discs is performed. Accordingly, the cost and time required for the reproduction test can be significantly reduced.

It is because if the BD-R disc or the BD-RE disc which is a data rewritable disc is used, even in a case where a reproduction error occurs, it is possible to rewrite modified content in the BD-R disc or the BD-RE disc and perform the reproduction test for the modified content.

However, as described above, the BD-DHD-ROM disc has the unique physical format and the unique logical format.

In a case where data of the unique format is recorded in the current BD-R/BD-RE disc, there is no guarantee that reproduction of UHD content from the BD-R/BD-RE disc is performed normally.

In other words, in a case where the UHD content to be recorded in the BD-UHD-ROM disc is copied and recorded in the BD-R disc or the BD-RE disc, a reproducing device performs a reproduction process according to the physical format and the logical format of the BD-R disc or the BD-RE disc.

However, the reproduction process is a process different from the reproduction process according to the physical format and the logical format compatible with the BD-DHD-ROM disc, and thus the content is not normally reproduced.

For example, a data reading bit rate specified as the logical format compatible with the BD-UHD-ROM disc is different from the reading bit rate specified as the logical format compatible with the BD-R disc or the BD-RE disc.

Even when the reproducing device reads and reproduces the UHD content recorded in the discs at the reading bit rate compatible with the BD-R disc or the BD-RE disc, the normal reproduction is unable to be performed.

In order to normally reproduce the BD-UHD-ROM record content, it is necessary to perform reproduction according to the reading bit rate corresponding to the BD-UHD-ROM record content.

However, there is a problem in that, at the present time, there is no provision for a process of reading or reproducing the UHD content from the BD-R disc or the BD-RE disc, and the normal reproduction of the UHD content from the BD-R disc or the BD-RE disc is unable to be executed.

Further, a related art in which a reading rate and a reproduction process from a disc are described is disclosed in, for example, Patent Document 1 (JP 2010-250939A).

CITATION LIST

Patent Document

Patent Document 1: Japanese Patent Application Laid-Open No. 2010-250939

SUMMARY OF THE INVENTION

Problems to be Solved by the Invention

The present disclosure was made, for example, in light of the above-mentioned problems, and it is an object of the present disclosure to provide an information processing device, an information processing method, and a program which are capable of recording, for example, content for BD-UHD-ROM disc recording in a data rewritable disc such as the BD-R disc or the BD-RE disc and implementing normal reproduction from the disc.

Solutions to Problems

A first aspect of the present disclosure lies in
an information processing device, including:
a data processing unit that executes a reproduction process for disc record data,
in which the data processing unit acquires a specified physical format compatible reading rate based on a physical format of a disc and a disc type compatible reading rate associated with disc type information recorded in the disc,
the data processing unit stores data read from the disc at a rate according to the physical format compatible reading rate in a buffer and outputs the data from the buffer at a rate according to the disc type compatible reading rate in a case where the physical format compatible reading rate does not coincide with the disc type compatible reading rate,
the data processing unit executes a reproduction process using the data output from the buffer.

Furthermore, a second aspect of the present disclosure lies in
an information processing method executed in an information processing device including a data processing unit that executes a reproduction process for disc record data, including:
acquiring, by the data processing unit, a specified physical format compatible reading rate based on a physical format of a disc and a disc type compatible reading rate associated with disc type information recorded in the disc;
storing, by the data processing unit, data read from the disc at a rate according to the physical format compatible reading rate in a buffer and outputting the data from the buffer at a rate according to the disc type compatible reading rate in a case where the physical format compatible reading rate does not coincide with the disc type compatible reading rate; and
executing, by the data processing unit, a reproduction process using the data output from the buffer.

Furthermore, a third aspect of the present disclosure lies in
a program causing information processing to be executed in an information processing device including a data processing unit that executes a reproduction process for disc record data, the program causing the data processing unit to execute:
acquiring a specified physical format compatible reading rate based on a physical format of a disc and a disc type compatible reading rate associated with disc type information recorded in the disc;
storing data read from the disc at a rate according to the physical format compatible reading rate in a buffer and outputting the data from the buffer at a rate according to the disc type compatible reading rate in a case where the physical format compatible reading rate does not coincide with the disc type compatible reading rate; and
executing a reproduction process using the data output from the buffer.

Further, the program of the present disclosure is, for example, a program that can be provided by a storage medium or a communication medium provided in a computer readable format to an information processing device or a computer system that can execute various program codes. By providing such a program in a computer readable format, processing in accordance with program on the information processing device or computer system is realized.

Still other objects, features and advantages of the present disclosure will be apparent from a detailed description based on the present disclosure embodiments described below and attached drawings. Further, in the specification, "system" is a logical aggregate configuration of a plurality of apparatuses, and it is not limited to those in which the apparatuses of the respective constitutions are in the same casing.

Effects of the Invention

According to one embodiment of the present disclosure, data reproduction is performed in a mode decided on the basis of disc type information which is record data of a disc. Specifically, for example, a reading rate compatible with a physical format of a disc is compared with a reading rate compatible with a disc type, and in a case where the reading rates do not coincide with each other, data read from the disc at the rate compatible with the physical format is stored in the buffer, and the reproduction process is performed using the data output from the buffer at the disc type compatible rate. In a case where the physical format is BD-R or BD-RE, and the logical format is a logical format compatible with BDMV-UHD, the emulation mode reproduction accompanied with the rate conversion using the buffer is performed.

With this configuration, it is possible to perform the reproduction process to which the correct bit rate suitable for the disc type is applied on the basis of the disc type information which is the record data configuration information of the disc.

Further, the effects described in the specification are merely examples and not limited, and additional effects may be included.

BRIEF DESCRIPTION OF DRAWINGS

FIG. 1 is a diagram for describing a configuration example of a disc being standardized.

FIG. 2 is a diagram for describing an example of a single-zone type disc and a multi-zone type disc having a low rate zone (LTR zone) and a high rate zone (HTR zone).

FIG. 5 is a diagram for describing a physical format of a BD-R disc.

FIG. 6 is a diagram for describing a physical format of a BD-RE disc.

FIG. 8 is a diagram for describing an example of combination of physical format and logical format.

FIG. 9 is a diagram for describing a data configuration of an index table recorded in a disc.

FIG. 10 is a diagram for describing an example of a disc type setting value and corresponding data.

MODE FOR CARRYING OUT THE INVENTION

Figure 3:
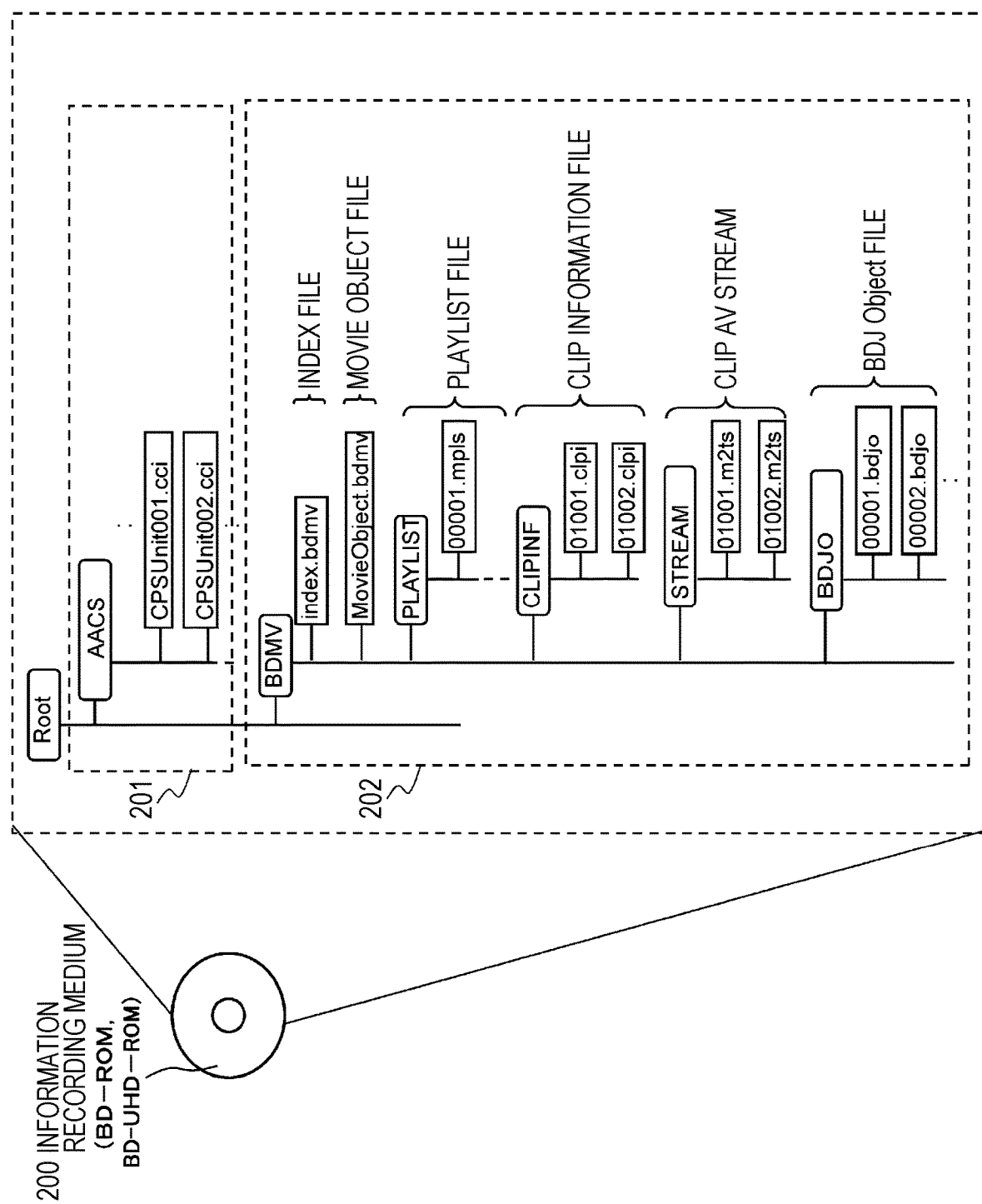
FIG. 3 is a diagram for describing one configuration example of data recorded in a Blu-ray (a registered trademark) disc (BD).

Hereinafter, an information processing device, an information processing method, and a program of the present disclosure will be described in detail with reference to the appended drawings. Further, the description will proceed in accordance with the following items.

1. Configuration example of disc compatible with ultra high definition (UHD) image
2. Record data and reproduction process example of disc
3. Problem in a case where UHD content is recorded in rewritable disc and reproduced
4. Configuration of recording UHD content in rewritable disc and implementing normal content reproduction
5. Reproduction process to which emulation mode is applied
6. Conclusion of processes executed by information processing device
7. Configuration example of information processing device
8. Conclusion of configuration of present disclosure

[1. Configuration Example of Disc Compatible With Ultra High Definition (UHD) Image]

First, a configuration example of a disc compatible with the ultra high definition (UHD) image will be described.

As described above, the ultra high definition image (UHD image) data recording form for the Blu-ray (a registered trademark) disc (BD) is currently being standardized in Blu-ray (a registered trademark) Disc Association (BDA).

Currently, in a standard being established, a possibility that a proposal of using various different types of discs together will be adopted is high.

Specifically, a possibility that a proposal of using the following two types of discs together will be adopted is high:

(A) a multi-zone setting disc in which data recording zones of different reading rates are set in an outer circumference zone and an inner circumference zone of a disc; and (B) a single zone setting disc in which a data reading zone of a single reading rate is set in all zones of a disc.

A configuration example of a disc which is being standardized will be described with reference to FIG. 1.

FIG. 1 is a diagram for describing disc configuration examples of eight types (1) to (8) which are now adopted as standards.

FIG. 1 illustrates the following data for each of the eight types (1) to (8):

(a) a disc capacity (gigabyte (GB)); and
(b) amaximum TS recording rate (Maximum MPEG-2transport stream bit rate (megabits/second (Mbps)))

Further, the types (5) and (8) illustrated in FIG. 1 are two-zone type discs in which different maximum recording rates are set in an inner circumferential portion and an outer circumference portion of a disc surface.

A low transfer rate (LTR) zone of the disc inner circumference portion is a disc zone in which data recording is performed at a relatively low recording rate, and data reading is performed at a low reading rate even at the time of data reading.

Further, a high transfer rate (HTR) zone of the disc outer circumference portion is a disc zone in which data recording is performed at a relatively high recording rate, and data reading is performed at a relatively high reading rate.

The disc (1) is a disc having the following configuration:
(a) a disc capacity=50 GB; and
(b) a maximum TS recording rate=64 Mbps.

The disc (2) is a disc having the following configuration:
(a) a disc capacity=50 GB; and
(b) a maximum TS recording rate=81.7 Mbps The disc (3) is a disc having the following configuration:
(a) a disc capacity=66 GB;
(b) a maximum TS recording rate=81.7 Mbps.

The disc (4) is a disc having the following configuration:
(a) a disc capacity=66 GB;
(b) a maximum TS recording rate=109 Mbps.

The disc (5) is a two-zone type disc in which two types of maximum recording rates are set in units of zones and has the following configuration:
(a) a disc capacity=66 GB;
(b1) a maximum TS recording rate of an LTR zone=109 Mbps; and
(b2) a maximum TS recording rate of a HTR zone=127 Mbps.

The disc (6) is a disc having the following configuration:
(a) a disc capacity=100 GB;
(b) a maximum TS recording rate=81.7 Mbps.

The disc (7) is a disc having the following configuration:
(a) a disc capacity=100 GB; and
(b) a maximum TS recording rate=109 Mbps.

The disc (8) is a two-zone type disc in which two types of maximum recording rates are set in units of zones and has the following configuration:
(a) a disc capacity=100 GB;
(b1) a maximum TS recording rate of an LTR zone=109 Mbps; and
(b2) a maximum TS recording rate of a HTR zone=127 Mbps.

Examples of the single-zone type discs illustrated in (1) to (4) and (6) to (7) of FIG. 1 and the two-zone type discs having the low rate zone (LTR zone) and the high rate zone (HTR zone) illustrated in (5) and (8) of FIG. 1 will be described with reference to FIG. 2.

FIG. 2(A) illustrates a configuration example of the single-zone type discs illustrated in (1) to (4) and (6) to (7) of FIG. 1.

FIG. 2(B) illustrates a configuration example of the two-zone type discs having the low rate zone (LTR zone) and the high rate zone (HTR zone) illustrated in (5) and (8) of FIG. 1.

In the single-zone type disc illustrated in FIG. 2(A), the entire data recording surface of the disc is constituted by a single rate zone 111 having a single maximum recording rate.

In the case of the 50 GB disc of (1) of FIG. 1, data of a maximum recording rate=64 Mbps is recorded in the single rate zone 111.

Further, in the case of the 50 GB disc of (2), the 66 GB disc of (3), and the 100 GB disc of (6) of FIG. 1, data of a maximum recording rate=81.7 Mbps is recorded in the single rate zone 111.

Further, in the case of the 66 GB disc of (4) and the 100 GB disc of (7) of FIG. 1, data of a maximum recording rate=109 Mbps is recorded in the single rate zone 111.

In the multi-zone type discs illustrated in FIG. 2(B), a low rate zone (LTR zone) 121 is set in the inner circumferential portion of the data recording surface of the disc, and a high rate zone (HTR zone) 122 is set in the outer circumferential portion.

In a case where the disc rotates at a constant speed, for example, 5000 rpm, an information processing device (a reproducing device) that executes data reproduction can perform data reading from data recording zones in which the data recording zone of the outer circumference portion is larger than that of the disc inner circumference portion. In other words, it is possible to set a high reading rate.

In the disc inner circumference portion, since a data readable length per unit time is smaller than in the outer circumference portion, the reading rate decreases, and it is difficult to perform data reading at a high rate.

On the other hand, in the disc outer circumference portion, since the data readable length per unit time is larger than in the inner circumference portion, it is possible to increase the reading rate, and data reading at a high rate is implemented.

This is the reason why the high reading rate zone (HTR zone) is set only in the disc outer circumference portion.

If the high rate zone (HTR zone) 122 is set as illustrated in FIG. 2(B), it is possible to increase a total data recording capacity of the disc, and it is possible to record the ultra high definition (UHD) image for a long time.

In the case of the 66 GB disc of (5) and the 100 GB disc of (8) of FIG. 1, data of a maximum recording rate=109 Mbps is recorded in the low rate zone 121, and data of a maximum recording rate=127.9 Mbps is recorded in the high rate zone 122.

Further, the information processing device (reproducing device) that executes the data reproduction executes data reading with a setting of a different maximum reading rate in each zone.

[2. Record Data and Reproduction Process Example of Disc]

In addition to data such as images, audios, and subtitles which are reproduction target data, a variety of data such as a reproduction control information file, a management information file, and the like to be applied to the reproduction process is recorded in the disc.

For example, a clip AV stream file configured with transport stream (TS) packets storing data such as images, audios, and subtitles serving as reproduction target data is recorded in a disc in which content such as a movie is recorded.

Further, a clip information file which is a control file set in association with the clip AV stream file, a playlist file, a movie object file storing a reproduction program, an index file having content title information and the like recorded therein, an encryption key file storing a key to be applied to decoding of content, and various other management information files are recorded.

One configuration example of data recorded in a Blu-ray (a registered trademark) disc (BD) will be described with reference to FIG. 3.

FIG. 3 is a diagram illustrating, for example, a directory of record data according to a BDMV format recorded in an information recording medium (disc) 200 serving as a BD-ROM or a BD-UHD-ROM which is a ROM type BD.

The directory is divided into a management information setting section 201 (an AACS directory) and a data section 202 (a BDMV directory) as illustrated in FIG. 3.

A CPS unit key file which is an encryption key for data, a use control information file, and the like are stored in the management information setting section 201 (AACS directory).

On the other hand, for example, the following files are recorded below the BDMV directory of the data section 202:
an index file;
a movie object file;
a playlist file;
a clip information file;
a clip AV stream file; and
a BDJO file.

Title information serving as index information to be applied to the reproduction process and the like are stored in the index file.

The reproduction program designated by a title is stored in the movie object file.

The playlist file is a file specifying a content reproduction order and the like according to program information of a reproduction program designated by a title and includes design information for clip information having reproduction position information.

The clip information file is a file designated by the playlist file and includes reproduction position information of a clip AV stream file and the like.

The clip AV stream file is a file storing AV stream data serving as a reproduction target.

The BDJO file is a file storing execution control information of a file storing a JAVA (a registered trademark) program, a command, and the like.

A sequence in which the information processing device reproduces content recorded in an information recording medium is as follows.

(a) First, a specific title is designated from the index file in accordance with a reproduction application.

(b) The reproduction program associated with the specified title is selected.

(c) A playlist specifying the content reproduction order and the like is selected in accordance with the program information of the selected reproduction program.

(d) An AV stream or a command serving as real content data is read in accordance with the clip information designated in the selected playlist, and an AV stream reproduction process or a command execution process is performed.

Figure 4:
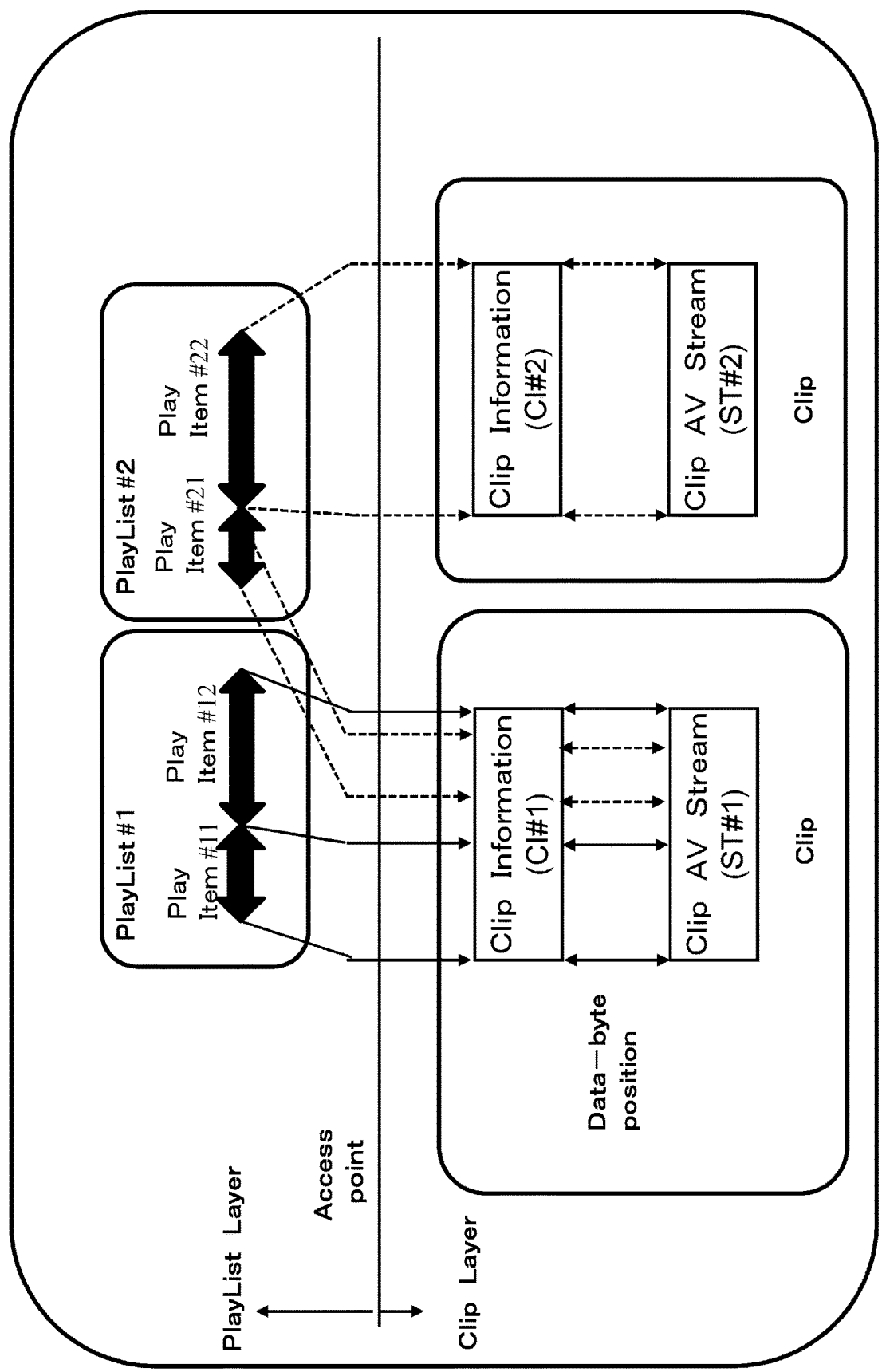
FIG. 4 is a diagram for describing a correspondence relation and a reproduction process example of data recorded in an information recording medium (disc).

FIG. 4 is a diagram for describing a correspondence relation of the following data recorded in the information recording medium (disc) 200:
a playlist file;
a clip information file; and
a clip AV stream file.

An AV stream configured with image and audio data which are actual reproduction target data is recorded as a clip AV stream file, and a playlist (PlayList) file and a clip information file are specified as the management information and the reproduction control information file of the AV stream.

As illustrated in FIG. 4, files of a plurality of categories are classified into the following two layers:

a playlist layer including the playlist (PlayList) file; and
a clip layer including the clip AV stream file and the clip information file.

Further, one clip information file is associated with one clip AV stream file, and these pair may be considered as one object and referred to collectively as a clip.

Management information such as detailed information of data included in the clip AV stream file, for example, an EP map in which I picture position information of MPEG data or the like is recorded is recorded in the clip information file.

The clip AV stream file stores data in which an MPEG-2 transport stream (TS) is arranged in accordance with a specified structure of a BDMV format.

Further, for example, management information for acquiring, for example, a reproduction start point of storage data of the clip AV stream file such as corresponding data such as a data position of a byte sequence data of the clip AV stream file, a reproduction time position such as an entry point (EP) which is a reproduction start point in a case where it is developed on a time axis, and the like is stored in the clip information file.

For example, when a time stamp indicating a reproduction time elapsed position from the start point of content is assigned, it is possible to acquire a data reading position of the clip AV stream file, that is, an address serving as the reproduction start point with reference to the clip information file.

The playlist (PlayList) file includes designation information of a reproduction interval for reproducible data included in the clip (=the clip information file+the clip AV stream file) layer.

At least one play item (PlayItem) is set in the playlist (PlayList) file, and each play item has the designation information of the reproduction interval for the reproducible data included in the clip (=the clip information file+the clip AV stream file) layer.

Further, the clip AV stream file storing real data of an image or an audio serving as the reproduction target has an MPEG-2 transport stream (TS) file structure.

[3. Problem in a Case Where UHD Content is Recorded in Rewritable Disc and Reproduced]

Next, for example, a problem in a case where the UHD content to be recorded in the BD-UHD-ROM disc is recorded in a data rewritable type disc such as the BD-R disc or the BD-RE disc and reproduced will be described.

As described above, in a case where the BD-UHD-ROM disc having content such as movies recorded therein is manufactured, it is necessary to perform a reproduction test of whether or not content recorded in the disc is normally reproduced.

After normal reproduction is confirmed in the reproduction test, mass production of the ROM disc is performed.

However, for example, in order to manufacture the BD-UHD-ROM disc having a certain UHD content recorded therein, it is necessary to manufacture a mold and stamper specific to content, and thus there is a problem in that it takes a time and cost.

In this regard, the UHD content scheduled to be recorded in the BD-UHD-ROM disc is written in a BD-R disc, a BD-RE disc, or the like which is a data rewritable disc. A reproduction test of whether or not the UHD content is reproduced normally using the data rewritable discs is performed.

With this process, the cost and time required for the reproduction test can be significantly reduced.

It is because if the BD-R disc or the BD-RE disc which is a data rewritable disc is used, even in a case where a reproduction error occurs, it is possible to rewrite modified content in the BD-R disc or the BD-RE disc and perform the reproduction test for the modified content repeatedly.

However, as described above, the BD-UHD-ROM disc has the unique physical format and the unique logical format.

In a case where data of the unique format is recorded in the current BD-R/BD-RE disc, there is no guarantee that the reproduction process will be performed normally.

In other words, in a case where the UHD content to be recorded in the BD-UHD-ROM disc is copied and recorded in the BD-R disc or the BD-RE disc, a reproducing device performs a reproduction process according to the physical format and the logical format of the BD-R disc or the BD-RE disc.

However, the reproduction process is a process different from the reproduction process according to the physical format and the logical format compatible with the BD-UHD-ROM disc, and thus the content is not normally reproduced.

For example, a data reading bit rate specified as the logical format compatible with the BD-UHD-ROM disc is different from the reading bit rate specified as the logical format compatible with the BD-R disc or the BD-RE disc.

Even when the reproducing device reads and reproduces the UHD content recorded in the discs at the reading bit rate compatible with the BD-R disc or the BD-RE disc, the normal reproduction is unable to be performed.

In order to normally reproduce the BD-UHD-ROM record content, it is necessary to perform reproduction according to the reading bit rate corresponding to the BD-UHD-ROM record content.

Further, this problem occur s not only in the reproduction test performed when the BD-UHD-ROM disc is manufactured but also in, for example, reproducing devices of general users.

In other words, in a case where the record data of the BD-UHD-ROM disc is coped to the BD-R disc or the BD-RE disc, and copy data is reproduced from the BD-R disc or the BD-RE disc, there arises a problem in that the UHD content is unable to be reproduced normally after all.

A configuration for solving the problem, that is, for example, a configuration capable of implementing a process of recording the UHD content to be recorded in the BD-UHD-ROM disc in the data rewritable type disc such as the BD-R disc or the BD-RE disc and reproducing the UHD content normally will be described later.

As described above, the BD-UHD-ROM disc has a unique physical format and a unique logical format.

Further, the physical format is, for example, a format of a configuration of a recording layer of a disc, a recording capacity, a recording bit rate, and the like, and a plurality of different physical formats are supposed to be used in the BD-UHD-ROM. The specific examples thereof have been described above with reference to FIGS. 1 and 2.

On the other hand, the logical format is, for example, a format specific to a file system or an application to be applied to a data recording process or a reproduction process for a disc, and includes provisions of, for example, an arrangement of data files on a disc, a data unit of recording or reading, and the like.

The reproducing device that executes the data reproduction process from the BD-UHD-ROM can perform a normal reproduction process by interpreting the unique physical format and the unique logical format corresponding to the BD-UHD-ROM disc, applying the reproduction sequence corresponding to the formats, and executing the reproduction process.

However, in a case where the record data for the BD-UHD-ROM is recorded in a disc having a physical format different from that of the BD-UHD-ROM, such as the BD-R disc and the BD-RE disc, there is a possibility that the reproducing device is unable to reproduce the UHD content normally by executing a reproduction process corresponding to a physical format and a logical format of a loaded disc.

FIGS. 5 and 6 illustrate examples of physical formats of the BD-R and the BD-RE.

FIG. 5 illustrates an example of the physical format of the BD-R.

FIG. 6 illustrates an example of the physical format of the BD-RE.

The following specified information is illustrated in each of FIGS. 5 and 6:
(a) a capacity;
(b) a wavelength of a laser diode (LD);
(c) a lens characteristic (N.A. of objective lens);
(d) a cover layer configuration (Cover Layer thickness);
(e) a capacity per layer;
(f) a track format;
(g) an address method;
(h) a rotation;
(i) a track pitch;
(j) a channel modulation;
(k) a minimum mark length;
(l) a total efficiency;
(m) a user data transfer rate;
(n) an evaluation index for signal quality; and
(o) a recording speed (write speed for media).

In a case where the BD-R medium is loaded into the information processing device (the reproducing device or the recording device), the information processing device confirms that the load medium (recording medium) is the BD-R medium on the basis of record data of a physical management information recording zone set in the inner circumference zone of the loaded medium.

On the basis of the confirmation, the information processing device performs data reproduction from BD-R medium or data recording in the BD-R medium in accordance with the physical format illustrated in FIG. 5.

In the case, the data reproduction or recording process according to the physical format and the logical format compatible with the BD-R medium is usually performed.

Further, in a case where the BD-RE medium is loaded into the information processing device (the reproducing device or the recording device), the information processing device confirms that the load medium is the BD-RE medium on the basis of the record data of the physical management information recording zone set in the inner circumference zone of the loaded medium.

On the basis of the confirmation, the information processing device performs data reproduction from BD-RE medium or data recording in the BD-RE medium in accordance with the physical format illustrated in FIG. 6.

In the case, the data reproduction or recording process according to the physical format and the logical format compatible with the BD-RE medium is usually performed.

For example, in a case where the record data of the BD-UHD-ROM disc is copied and recorded in the BD-R disc or the BD-RE disc, the UHD data is recorded in accordance with the format of the BD-R disc or the BD-RE disc illustrated in FIG. 5 or 6, for example.

However, the format such as the data arrangement is still the unique logical format corresponding to the BD-UHD-ROM.

Further, in a case where the data copied to the BD-R disc or the BD-RE disc is reproduced, if the loaded disc is the BD-R disc or the BD-RE disc, the information processing device that executes the reproduction process determines that data according to the logical format compatible with the BD-UHD-ROM is data according to the logical format compatible with the BD-R disc or the BD-RE disc and then reproduces the data. In the case, the normal reproduction of the UHD data is unable to be performed, leading to a reproduction error.

[4. Configuration of Recording UHD Content in Rewritable Disc and Implementing Normal Content Reproduction]

Next, a configuration capable of implementing the normal reproduction of the UHD content, for example, in a case where the UHD content to be recorded in the BD-UHD-ROM disc is recorded in a data rewritable type disc such as the BD-R disc or the BD-RE disc and reproduced will be described.

Figure 7:
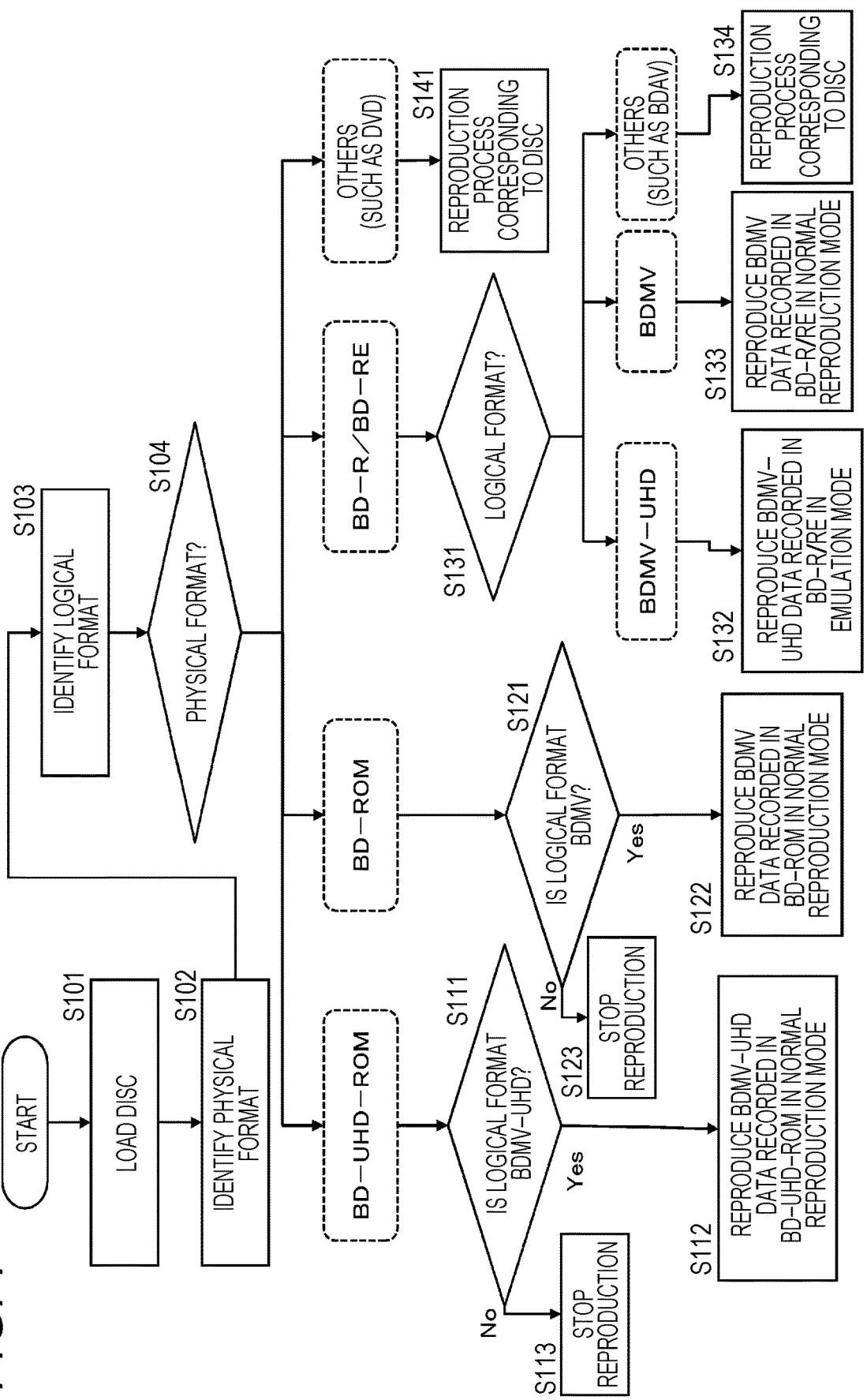
FIG. 7 is a flowchart for describing a processing sequence executed by an information processing device of the present disclosure.

FIG. 7 is a flowchart describing a disc record content reproduction sequence executed by the information disclosure device of the present disclosure.

The flowchart illustrated in FIG. 7 is a flowchart for describing a processing sequence executed by an information processing device which is loaded with various types of discs and reproduces the disc record content.

A storage unit of the information processing device stores a program such as a reproduction application for executing a process according to the flow illustrated in FIG. 7.

The information processing device executes the program (the reproduction application) and executes the process according to the flow illustrated in FIG. 7 through a data processing unit including a CPU or the like with a program (reproduction application) executing function.

Hereinafter, a process of steps of the flow illustrated in FIG. 7 will be sequentially described.

(Step S101)

First, the information processing device is loaded with a disc.

The loaded disc is assumed to be various types of different discs.

Specifically, various types of discs having combinations of a plurality of different physical formats and logical formats are assumed.

Examples of a specific physical format include the following physical formats:
(1) BD-UHD-ROM;
(2) BD-ROM;
(3) BD-R;
(4) BD-RE; and
(5) Others (DVD or the like).

Further, examples of a specific logical format include the following logical formats:
(1) BDMV-UHD;
(2) BDMV; and
(3) Others (BDAV or the like).

As an example of a disc having combinations or a plurality of different physical formats and logical formats, specifically, for example, different types of discs illustrated in FIG. 8 are assumed.

FIG. 8 illustrates the following nine types of discs as representative examples of the discs loaded into the information processing device.
(1) physical format=BD-UHD-ROM, logical format=BDMV-UHD;
(2) physical format=BD-ROM, logical format=BDMV;
(3) physical format=BD-R, logical format=BDMV-UHD;
(4) physical format=BD-R, logical format=BDMV;

(5) physical format=BD-R, logical format=others (BDAV or the like);

(6) physical format=BD-RE, logical format=BDMV-UHD;

(7) physical format=BD-RE, logical format=BDMV;

(8) physical format=BD-RE, logical format=others (BDAV or the like); and (9) physical format=others (DVD or the like), logical format=others.

For example, one of the nine types of discs is loaded into the information processing device.

(Step S102)

In step S102, the information processing device identifies the physical format of the loaded disc.

The identification process is performed by reading the management information recorded in the inner circumference zone of the loaded disc. Alternatively, the physical format determination process is performed by applying various existing techniques, for example, the physical format is determined by determining whether or not data can be read by experimental irradiation of spot light by an optical header (laser diode (LD)) for read data.

With the physical format identification process in the step S102, any one of the following types of physical formats is identified as a physical format of the disc loaded into the information processing device:

(1) BD-UHD-ROM;
(2) BD-ROM;
(3) BD-R;
(4) BD-RE; and
(5) Others (DVD or the like)

(Step S103)

Next, the information processing device identifies the logical format of the loaded disc.

The identification process is executed, for example, through a process of analyzing directory information of record data from the management information recorded in the loaded disc or the like. The logical format determination process is also performed by applying various existing techniques.

With the logical format identification process in the step S103, any one of the following types of logical formats is identified as a logical format of the disc loaded into the information processing device:

(1) BDMV-UHD;
(2) BDMV; and
(3) Others (BDAV or the like).

(Step S104)

A process of step S104 and subsequent steps is a bifurcation process for executing different reproduction processes in accordance with the physical format and the logical format of the loaded disc identified in steps S102 and S103.

First, in step S104, a bifurcation process according to the physical format of the loaded disc is executed.

(a) In a case where the physical format of the loaded disc is determined to be the physical format compatible with the BD-UHD-ROM, the process proceeds to step S111.

(b) In a case where the physical format of the loaded disc is determined to be the physical format compatible with the BD-ROM, the process proceeds to step S121.

(c) In a case where the physical format of the loaded disc is determined to be the physical format compatible with the BD-R or the BD-RE, the process proceeds to step S131.

(d) In a case where the physical format of the loaded disc is determined to be any other physical format such as DVD, the process proceeds to step S141.

(Step S111)

In the determination process of the physical format of the loaded disc in step S104, the determination process (a), that is, (a) in a case where the physical format of the loaded disc is determined to be the physical format compatible with the BD-UHD-ROM, the process proceeds to step S111.

In step S111, it is determined whether or not the logical format of the loaded disc identified in step S103 is the BDMV-UHD.

In a case where the logical format of the loaded disc identified in step S103 is the BDMV-UHD, the process proceeds to step S112.

In the case, the loaded disc has a setting of the following format combination:

physical format=BD-UHD-ROM; and
logical format=BDMV-UHD.

On the other hand, in a case where the logical format of the loaded disc identified in step S103 is not the BDMV-UHD, the process proceeds to step S113.

In the case, the loaded disc has a setting of the following format combination:

physical format=BD-UHD-ROM; and
logical format=logical format other than BDMV-UHD.

(Step S112)

In a case where the process proceeds to step S112, the loaded disc has a setting of the following format combination:

physical format=BD-UHD-ROM; and
logical format=BDMV-UHD.

In a case where the disc of such a format combination is determined to be loaded, in step S112, the information processing device reproduces the record data of the loaded disc.

In other words, in the normal reproduction mode, the information processing device reproduces record data from the physical format=BDMV-UHD-ROM in accordance with the logical format=BDMV-UHD.

In the reproduction process, a reproduction application compatible with the BDMV-UHD logical format data for reproducing data according to the logical format=BDMV-UHD is used.

(Step S113)

In a case where the process proceeds to step S113, the loaded disc has a setting of the following format combination:

physical format=BD-UHD-ROM; and
logical format=logical format other than BDMV-UHD.

In a case where the disc of such a format combination is determined to be loaded, in step S113, the information processing device ends the process without reproducing the record data of the loaded disc.

(Step S121)

Further, in the determination process of the physical format of the loaded disc in step S104, the following determination process, that is, (b) in a case where the physical format of the loaded disc is determined to be the physical format compatible with the BD-ROM, the process proceeds to step S121.

In step S121, it is determined whether or not the logical format of the loaded disc identified in step S103 is the BDMV.

In a case where the logical format of the loaded disc identified in step S103 is the BDMV, the process proceeds to step S122.

In the case, the loaded disc has a setting of the following format combination:

physical format=BD-ROM; and
logical format=BDMV.

On the other hand, in a case where the logical format of the loaded disc identified in step S103 is not the BDMV, the process proceeds to step S123.

In the case, the loaded disc has a setting of the following format combination:
physical format=BD-ROM; and
logical format=logical format other than BDMV.

(Step S122)

In a case where the process proceeds to step S122, the loaded disc has a setting of the following format combination:
physical format=BD-ROM; and
logical format=BDMV.

In a case where the disc of such a format combination is determined to be loaded, in step S122, the information processing device reproduces the record data of the loaded disc.

In other words, in the normal reproduction mode, the information processing device reproduces recorded data from the physical format=BDMV-ROM in accordance with the logical format=BDMV.

In the reproduction process, a reproduction application compatible with the BDMV logical format data for reproducing data according to the logical format=BDMV is used.

(Step S123)

In step S123, the loaded disc has a setting of the following format combination:
physical format=BD-ROM; and
logical format=logical format other than BDMV.

In a case where the disc of such a format combination is determined to be loaded, in step S123, the information processing device ends the process without reproducing the record data of the loaded disc.

(Step S131)

Further, in the determination process of the physical format of the loaded disc in step S104, the following determination process, that is, (c) in a case where the physical format of the loaded disc is determined to be the physical format compatible with the BD-R or the BD-RE, the process proceeds to step S131.

In step S131, it is determined whether or not the logical format of the loaded disc identified in step S103 is one of the following formats:

(1) BDMV-UHD;
(2) BDMV; and
(3) Others (BDAV or the like).

In a case where the logical format of the loaded disc identified in step S103 is
(1) BDMV-UHD,
the process proceeds to step S132.

In the case, the loaded disc has a setting of the following format combination:
physical format=BD-R or BD-RE; and
logical format=BDMV-UHD.

Further, in a case where the logical format of the loaded disc identified in step S103 is
(2) BDMV,
the process proceeds to step S133.

In the case, the loaded disc has a setting of the following format combination:
physical format=BD-R or BD-RE; and
logical format=BDMV.

Further, the logical format of the loaded disc identified in step S103 is (3) Others (BDAV or the like),
the process proceeds to step S134.

In the case, the loaded disc has a setting of the following format combination:
physical format=BD-R or BD-RE; and
logical format=BDAV or the like and other logical formats (BDMV-UHD, logical format other than BDMV).

(Step S132)

In a case where the process proceeds to step S132, the loaded disc has a setting of the following format combination:
physical format=BD-R or BD-RE; and
logical format=BDMV-UHD.

In a case where the disc of such a format combination is determined to be loaded, in step S132, the information processing device reproduces the record data of the loaded disc in an emulation mode.

The emulation mode is a reproduction mode different from the normal reproduction mode, that is, a reproduction mode in which a specified reading bit rate associated with a physical medium indicator (disc type) is compared with a specified reading bit rate associated with a physical format of a disc with reference to a setting value of the physical medium indicator (disc type (disc_type)) recorded in the disc, and in a case where both of the specified reading bit rates coincide with each other, a reproduction process different from that executed in a case where both of the specified reading bit rates do not coincide with each other is executed.

If the emulation mode is applied, it is possible to perform the normal reproduction process of the BDMV-UHD data recorded in the disc having the physical format of BD-R or BD-RE.

The reproduction sequence using the emulation mode will be described in detail later.

(Step S133)

In a case where the process proceeds to step S133, the loaded disc has a setting of the following format combination:
physical format=BD-R or BD-RE; and
logical format=BDMV.

In a case where the disc of such a format combination is determined to be loaded, in step S133, the information processing device reproduces the record data of the loaded disc in the normal reproduction mode.
physical format=BD-R or BD-RE
logical format=BDMV For the data reproduction process of such a format combination, the standard has already been established, and by using a reproduction program conforming to the standard, it is possible to perform the normal reproduction process of the BDMV data recorded in the disc having the physical format of BD-R or BD-RE.

(Step S134)

In a case where the process proceeds to step S134, the loaded disc has a setting of the following format combination:
physical format=BD-R or BD-RE; and
logical format=BDAV or the like and other logical formats (BDMV-UHD, logical format other than BDMV).

In a case where the disc of such a format combination is determined to be loaded, in step S134, the information processing device determines whether or not the normal reproduction is possible and executes the reproduction process only in a case where the reproduction is possible.

[5. Reproduction Process to Which Emulation Mode is Applied]

Next, the reproduction process of the UHD data to which the emulation mode executed in step S132 in the flowchart illustrated in FIG. 7 is applied will be described.

The emulation mode is a reproduction mode different from the normal reproduction mode and activated in a case where the loaded disc has a setting of the following format combination:

physical format=BD-R or BD-RE; and
logical format=BDMV-UHD.

In a case where the disc of such a format combination is determined to be loaded, the information processing device activates the emulation mode.

In the emulation mode, a specified reading bit rate associated with a physical medium indicator (disc type) is compared with a specified reading bit rate associated with a physical format of a disc with reference to a setting value of the physical medium indicator (disc type (disc_type)) recorded in the disc, and in a case where both of the specified reading bit rates coincide with each other, a reproduction process different from that executed in a case where both of the specified reading bit rates do not coincide with each other is executed.

If the emulation mode is applied, it is possible to perform the normal reproduction process of the BDMV-UHD data recorded in the disc having the physical format of BD-R or BD-RE.

The physical medium indicator (disc type (disc_type)) recorded in the disc will be described with reference to FIGS. 9 and 10.

FIG. 9 is a diagram illustrating a part of record data of an index table in the index file recorded in the disc.

For example, the following data is recorded in the index table:

(a) data length [length];
(b) type information of reproduction start data (a 3D image, a 2D image, or the like) [initial_out_mode_preference];
(c) information of whether there is 3D image data in disc [SS_content_exist_flag]; and
(d) a physical medium identifier (disc type) [disc_type].

Further, FIG. 9 illustrates only a part of the data recorded in the index table, and various data are recorded in the index table in addition to the data.

Among the record data of the index table illustrated in FIG. 9, the following data is identification information of a type of an information recording medium type, that is, a disc type:

(d) a physical medium identifier (disc type) [disc_type].

The information processing device that executes the reproduction process of the record data of the disc can read the physical medium identifier (disc type) [disc_type] and decide the reading bit rate necessary for the normal reproduction of the recording data on the basis of the setting value of the read disc type.

In other words, the physical medium identifier (disc type) [disc_type] is information specifying the reading bit rate to be applied to the content reproduction of the disc.

The information processing device that executes the reproduction process holds a disc type setting value and corresponding information such as the reading bit rate to be applied to the content reproduction, and decides the reading bit rate on the basis of the corresponding information.

FIG. 10 illustrates an example of specific values of the physical medium identifier (disc type) [disc_type] and corresponding information such as the reading bit rates associated with respective values.

An example of setting values of the physical medium identifier (disc type) [disc_type] and data associated with the respective setting values will be described with reference to FIG. 10.

As illustrated in FIG. 10, for example, there are the following disc type setting values and corresponding data:

(1) disc type=0010b
capacity=50 GB, zone setting=single zone, reading bit rate=71.9 Mbps, and maximum recording rate=64 Mbps;

(2) disc type=0011b
capacity=50 GB, zone setting=single zone, reading bit rate=91.9 Mbps, and maximum recording rate=81.7 Mbps.

(3) disc type=0100 b
capacity=60 GB or 100 GB, zone setting=single zone, reading bit rate=91.9 Mbps, and maximum recording rate=81.7 Mbps;

(4) disc type=0101b
capacity=60 GB or 100 GB, zone setting=single zone, reading bit rate=122.5 Mbps, and maximum recording rate=109 Mbps; and (5) disc type=0110b
capacity=60 GB or 100 GB and zone setting=two zones of LTR zone and HTR zone,
reading bit rate (LTR zone)=122.5 Mbps,
reading bit rate (HTR zone)=143.9 Mbps,
maximum recording rate (LTR zone)=109 Mbps, and
maximum recording rate (HTR zone)=127.9 Mbps.

As described above, the physical medium identifier (disc type) information indicating a type and a configuration of a disc is recorded in the index table, and the information processing device that executes the reproduction of the disc record content first reads the index table and acquires the setting value of the disc type information recorded in the index table.

The information processing device can detect the disc configuration and the reproduction mode information such as the reading bit rate necessary for the reproduction process in accordance with the setting value indicating the disc type recorded in the index table and execute the accurate reproduction process corresponding to the disc configuration.

As described above, the data processing unit of the reproducing device that executes the data reproduction from the disc reads the disc type information recorded in the disc, detects the record data configuration of the disc on the basis of the read disc type information, and executes the data reading and reproduction processes in accordance with the reading rate corresponding to the detected record data configuration.

On the basis of the disc type information, the reproducing device can check zone setting information indicating whether or not the disc is a single-zone type disc including a single reading rate zone or the disc is a multi-zone type disc including a plurality of different reading rate zones, total recording capacity information, the reading rate, and the like.

The reproducing device holds, for example, a table including the disc type information and the corresponding data thereof illustrated in FIG. 10 in a storage unit and obtains information such as the disc configuration and the reading bit rate on the basis of the setting value of the disc type read from the loaded disc with reference to the table. The data processing unit of the reproducing device executes the data reproduction process by applying such information and an optimum reproduction algorithm.

For example, in a case where the disc is a single-zone type disc including a single reading rate zone, the data reading and reproduction processes according to the same algorithm are executed on the entire zone of the disc.

Further, in a case where the disc is a multi-zone type disc including a plurality of different reading rate zones, the data reading and reproduction processes are executed by applying different algorithms in units of zones of the disc.

Next, a specific processing sequence of the reproduction process according to the emulation mode executed using the disc type information of the index table described with reference to FIGS. 9 and 10 will be described with reference to the flowchart illustrated in FIG. 11.

Figure 11:
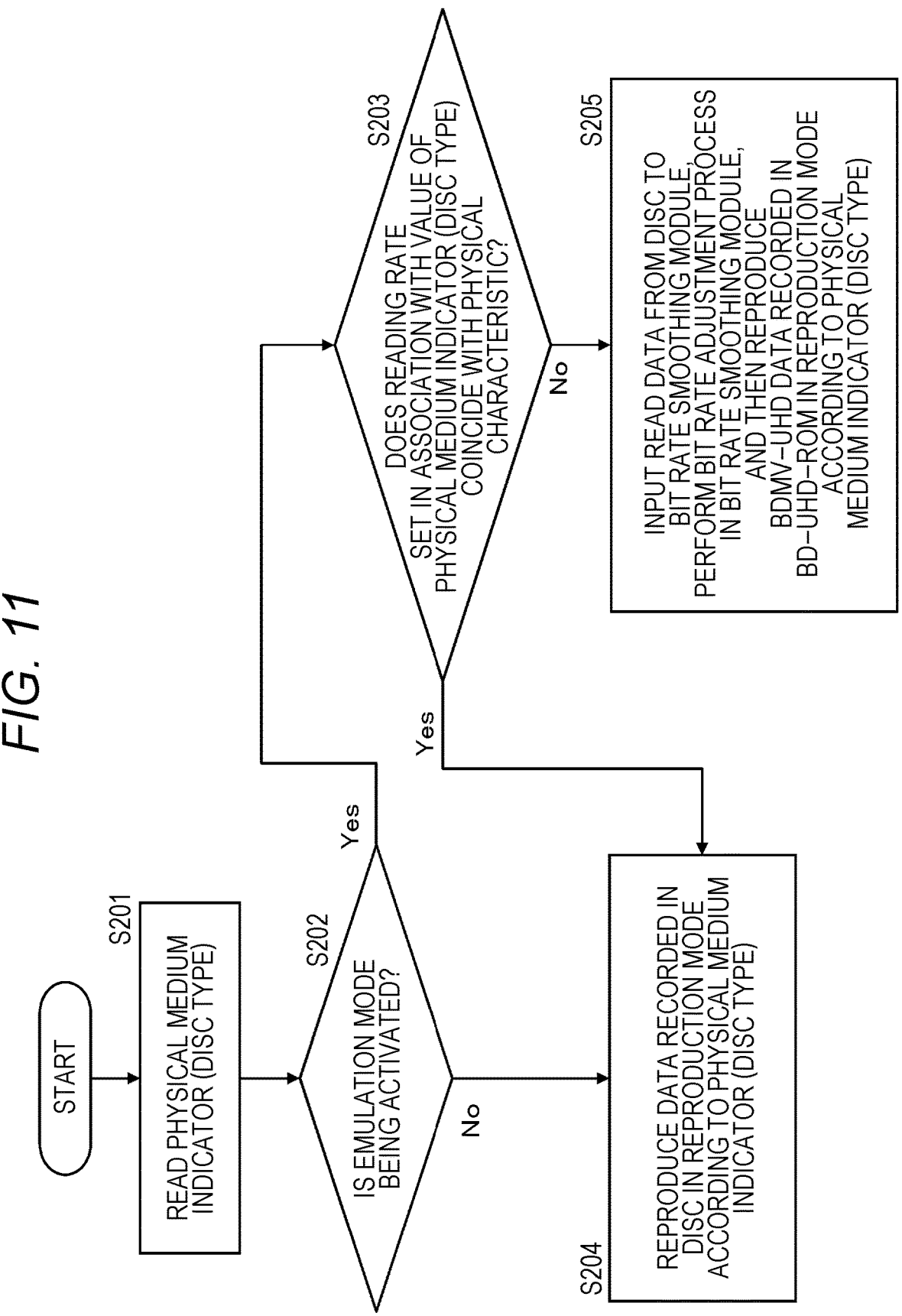
FIG. 11 is a flowchart for describing a processing sequence executed by an information processing device of the present disclosure.

FIG. 11 is a flowchart describing a processing sequence executed by the information processing device (reproducing device) that reproduces content recorded in the disc.

The flow illustrated in FIG. 11 is executed under control of the data processing unit having a CPU with a program execution function in the reproducing device. A program to be executed is a program (reproduction program) prestored in the storage unit of the reproducing device or a program (reproduction application) recorded in the disc.

A process of respective steps of the flow illustrated in FIG. 11 will be described below.

(Step S201)

First, in step S201, the information processing device reads the index table recorded together with the content from the disc storing the reproduction target content.

For example, the data according to the directory described above with reference to FIG. 3 is recorded in the disc. Further, the index table including the disc type information described above with reference to FIG. 9 is recorded.

The clip information file, the playlist file, the movie object file, the index file, and the like are recorded in the disc in addition to the clip AV stream file which is the reproduction target.

The information processing device first reads the index file and reads the index table stored in the index file.

The index table is a table in which the disc type information described above with reference to FIGS. 9 and 10 is recorded.

(Step S202)

In step S202, the information processing device determines whether or not the emulation mode is currently being activated.

As described above as the process of step S132 of the flowchart of FIG. 7, the emulation mode is activated when the loaded disc has a setting of the following format combination as described above:

physical format=BD-R or BD-RE; and
logical format=BDMV-UHD.

In a case where the disc of such a format combination is determined to be loaded, the information processing device activates the emulation mode in step S132 of the flow illustrated in FIG. 7.

As described above, the emulation mode is a reproduction mode different from the normal reproduction mode, that is, a reproduction mode in which a specified reading bit rate associated with a physical medium indicator (disc type) is compared with a specified reading bit rate associated with a physical format of a disc with reference to a setting value of the physical medium indicator (disc type (disc_type)) recorded in the disc, and in a case where both of the specified reading bit rates coincide with each other, a reproduction process different from that executed in a case where both of the specified reading bit rates do not coincide with each other is executed.

If the emulation mode is applied, it is possible to perform the normal reproduction process of the BDMV-UHD data recorded in the disc having the physical format of BD-R or BD-RE.

In a case where it is determined in step S202 that the emulation mode is being activated, the information processing device causes the process to proceed to step S203, and On the other hand, in a case where it is determined that the emulation mode is not being activated, the information processing device causes the process to proceed to step S204.

(Step S203)

Next, in step S203, the information processing device determines whether or not the reading rate of the disc record content associated with the setting value of the physical medium identifier (disc type) read from the disc in step S201 coincides with the reading rate serving as the physical characteristic determined on the basis of the physical format of the disc.

Further, the reading rate of the disc record content associated with the setting value of the physical medium identifier (disc type) is the reading rate compatible with the disc type described above with reference to FIG. 10.

Further, in this example, the reading rate serving as a physical characteristic determined on the basis of the physical format of the disc is, for example, a reading rate compatible with the physical format of each of the BD-R and the BD-RE which are the loaded discs.

The information processing device holds the reading rate information associated with the physical formats.

In a case where the reading rate associated with the setting value of the physical medium identifier (disc type) coincides with the reading rate serving as the physical characteristic determined on the basis of the physical format of the disc, the process proceeds to step S204.

On the other hand, in a case where the reading rates do not coincide with each other, the process proceeds to step S205.

(Step S204)

In a case where the reading rate associated with the setting value of the physical medium identifier (disc type) read from the loaded disc coincides with the reading rate serving as the physical characteristic determined on the basis of the physical format of the disc in the determination process of step S203, the process proceeds to step S204.

In step S204, the information processing device applies the reproduction mode according to the setting value of the physical medium identifier (disc type) read from the loaded disc, for example, the reading rate corresponding to the setting value of the physical form identifier (disc type), and execute the reproduction process of the disc record content.

The process of step S204 is performed in a case where the reading rate corresponding to the setting value of the physical medium identifier (disc type) coincides with the reading rate compatible with the physical format of the disc, and the normal reproduction process is executed.

Further, the process in step S204 is executed even in a case where the emulation mode is determined not to be activated in step S202.

As described above, the emulation mode is activated when the loaded disc has a setting of the following format combination:

physical format=BD-R or BD-RE; and
logical format=BDMV-UHD.

The process of step S204 is also executed in the normal reproduction mode of other format combinations.

In other words, even in the normal reproduction mode other than the emulation mode, the information processing device applies the reproduction mode according to the setting value of the physical medium identifier (disc type) read from the loaded disc, for example, the reading rate corresponding to the setting value of the physical medium identifier (disc type), and execute the reproduction process of the disc record content.

(Step S205)

On the other hand, in a case where the reading rate associated with the setting value of the physical medium identifier (disc type) read from the loaded disc does not coincide with the reading rate serving as the physical characteristic determined on the basis of the physical format of the disc in the determination process of step S203, the process proceeds to step S205.

In step S205, the information processing device inputs the read data from the disc to a bit rate smoothing module, performs a bit rate adjustment process in the bit rate smoothing module, and then reproduces the BDMV-UHD data recorded in the BD-UHD-ROM in the reproduction mode according to the physical medium indicator (disc type).

A configuration and a process of the bit rate smoothing module will be described with reference to FIG. 12.

Figure 12:
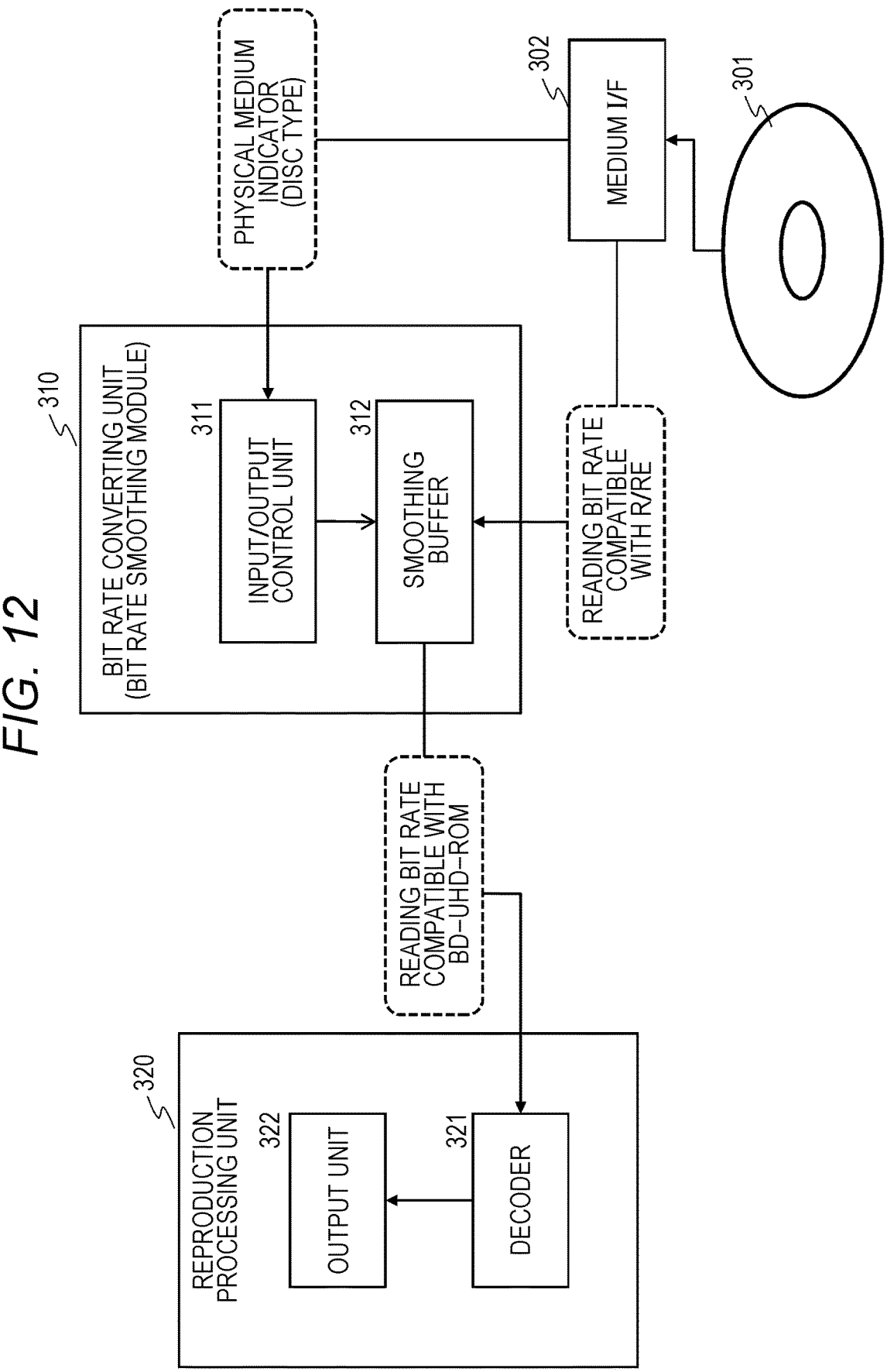
FIG. 12 is a diagram for describing a bit rate conversion process executed by an information processing device of the present disclosure.

FIG. 12 is a block diagram illustrating a part of a configuration of an information processing device which is loaded with a disc 301 and executes the reproduction process.

In this example, it is assumed that the physical format of the disc 301 is BD-R or BD-RE, and the record content is UHD content according to the BDMV-UHD logical format originally recorded in the BD-UHD-ROM.

The content recorded in the disc 301 is read via a medium I/F 302 constituted by a medium drive or the like, and the read data is temporarily stored in a smoothing buffer 312 of a bit rate converting unit (bit rate smoothing module) 310.

The reading bit rate of the data read from the disc 301 via the medium I/F 302 is the bit rate compatible with the standard of the physical format of the disc 301. In other words, the data reading process is executed at the reading bit rate compatible with the BD-R disc or the reading bit rate compatible with the BD-RE disc, and the read data is stored in the smoothing buffer 312.

An input/output control unit 311 of the bit rate converting unit 310 controls an input of data to the smoothing buffer 312 and an output of data from the smoothing buffer 312.

The input/output control unit 311 outputs the disc read data stored in the smoothing buffer 312 to a decoder 321 of a reproduction processing unit 320 at the reading rate compatible with the BD-UHD-ROM.

The bit rate to be output to the decoder 321 of the reproduction processing unit 320 is decided on the basis of the physical medium identifier (disc type) read from the disc 301.

The index table in which the data illustrated in FIG. 9 is recorded is recorded in the disc as described above with reference to FIGS. 9 and 10.

The input/output control unit 311 of the bit rate converting unit 310 acquires the physical medium identifier (disc type) in the record data, and outputs the data stored in the smoothing buffer to the decoder 321 of the reproduction processing unit 320 at the same bit rate as the reading bit rate associated with the physical medium identifier (disc type).

The reading bit rate is associated with each of the disc types (0010 to 0110) as described above with reference to FIG. 10.

The input/output control unit 311 of the bit rate converting unit 310 holds corresponding data similar to the corresponding data illustrated in FIG. 10, acquires the original reading rate of the content (UHD content) also stored in the disc 301 on the basis of the corresponding data, and outputs the data stored in the smoothing buffer 312 to the decoder 321 of the reproduction control unit 320 at a rate similar to the reading rate.

Further, in order to reliably execute the bit rate conversion, the input/output, control unit 311 executes reading of data from the disc 301 in advance, stores the read data in the smoothing buffer 312 to some extent, and then starts a data output from the smoothing buffer 312 to the decoder 321.

With this process, even in a case where the R/RE compatible reading rate is lower than the reading rate compatible with the BD-UHD-ROM, the data output from the smoothing buffer 312 can be continuously performed without interrupting the output to the decoder 321.

The reproduction processing unit 320 executes the reproduction process using data input f rom the smoothing buffer 312 in accordance with the reading rate compatible with the BD-UHD-ROM. The reproduction process is a reproduction process similar to the reproduction of the UHD content from the BD-UHD-ROM.

The read data is input to the decoder 321 at a reading bit rate similar to that for the reproduction of the UHD content from BD-UHD-ROM, and the decoding process is performed.

The decoding result is output via an output unit 322.

Through the reproduction process accompanied by the bit rate conversion process performed by the bit rate converting unit 310, the normal reproduction process similar to that for the UHD content stored in the BD-UHD-ROM disc can be performed on the UHD content stored in the BD-R disc or the BD-RE disc.

[6. Conclusion of Processes Executed by Information Processing Device]

Next, the processes executed by the information disclosure device of the present disclosure will be described collectively.

The following items will be sequentially described.

(1) Emulation (2) Discrimination process of physical format and logical format (3) Bit rate conversion process (4) Plain text content reproduction process (5) Interactive function (6) Others (1) Emulation As described above with reference to the flowchart illustrated in FIG. 7, the information disclosure device of the present disclosure executes the emulation mode activation process in step S132 in the flowchart illustrated in FIG. 7.

The emulation mode is a reproduction mode different from the normal reproduction mode and is activated in a case where the loaded disc has a setting of the following format combination:

physical format=BD-R or BD-RE; and logical format=BDMV-UHD.

In a case where the disc of such a format combination is determined to be loaded, the information processing device activates the emulation mode.

In the reproduction process in the emulation mode, a specified reading bit rate associated with a physical medium indicator (disc type) is compared with a specified reading bit rate associated with a physical format of a disc with reference to a setting value of the physical medium indicator (disc type (disc type)) recorded in the disc, and in a case where both of the specified reading bit rates coincide with each other, a reproduction process different from that executed in a case where both of the specified reading bit rates do not coincide with each other is executed.

As described above with reference to the flowchart illustrated in FIG. 11, in a case where the reading bit rates coincide with each other, the reproduction mode according to the setting value of the physical medium identifier (disc type) read from the loaded disc, for example, the reading rate corresponding to the setting value of the physical medium identifier (disc type) is applied, and the reproduction process of the disc record content is executed.

On the other hand, in a case where the reading bit rates do not coincide with each other, as described above with reference to FIG. 12, the read data from the disc is input to the bit rate converting unit (the bit rate smoothing module), the bit rate adjustment process is performed, and then the BDMV-UHD data recorded in the BD-UHD-ROM is reproduced in the reproduction mode according to the physical medium indicator (disc type).

By executing these processes, the normal reproduction of the UHD content recorded in the BD-R or the BD-RE disc is implemented.

Further, the activation timing of the emulation mode can be variously set.

Here, instead of activating in the emulation mode when the device is powered on, it is preferable to perform a setting of receiving a result of the discrimination process for the physical format of the loaded disc and the logical format of the record data and transitioning to or activating the emulation mode.

(2) Discrimination Process of Physical Format and Logical Format

As described above with reference to the flowchart illustrated in FIG. 7, the information processing device of the present disclosure performs the physical format identification process of the loaded disc and the logical format identification process of the content recorded in the loaded disc prior to the content reproduction from the loaded disc.

The physical format identification process is performed by reading the management information recorded in the inner circumference zone of the loaded disc. Alternatively, the physical format determination process is performed by applying various existing techniques, for example, the physical format is determined by determining whether or not data can be read by experimental irradiation of spot light by an optical header (laser diode (LD)) for read data.

Further, the logical format identification process is executed, for example, through the process of analyzing the directory information of the record data from the management information recorded in the disc or the like.

For the physical format and logical format determination process, many related arts are disclosed, and the disclosed techniques can be applied.

(3) Bit Rate Conversion Process

As described above with reference to FIG. 12, the information disclosure device of the present disclosure may perform the data reproduction accompanied by the bit rate conversion process when the emulation mode is activated.

In other words, the data reproduction accompanied by the bit rate conversion process is performed in a case where the reading rate associated with the setting value of the physical medium identifier (disc type) read from the loaded disc does not coincide with the reading rate serving as the physical characteristic determined on the basis of the physical format of the disc.

The information processing device inputs the data read from the disc to the bit rate converting unit (the bit rate smoothing module) 310 illustrated in FIG. 12, performs the bit rate adjustment processing in the bit rate converting unit (the bit rate smoothing module) 310, and then reproduces the BDMV-UHD data recorded in the BD-UHD-ROM in the reproduction mode according to the physical medium indicator (disc type).

(4) Plain Text Content Reproduction Process

In a case where content recorded in the disc is encrypted content, the information processing device performs a decryption process on the encrypted content which is disc read data supplied via a disc drive.

It is also possible to record data for BD-UHD-ROM disc recoding in the BD-R disc or the BD-RE disc as plain text data without carrying out an encryption process.

In the case, in the reproduction process to which the emulation mode is applied, the reproduction process with no decoding process is perforated.

Further, in a case where content recorded in the BD-R disc or the BD-RE disc is encrypted content, a reproduction process accompanied by the decryption processing is executed.

(5) Interactive Function

In a case where the information processing device loaded with a disc (BD) reproduces content recorded in the disc (BD), it may be necessary to establish a connection with a content management server and perform a predetermined procedure between the information processing device and the server.

For example, there are cases in which, when the record content of the BD-ROM disc is reproduced or the content output process is performed, the information processing device performs a process of making an inquire to the server about whether not content reproduction or output from the loaded disc is allowed and acquiring a reproduction permission from the server prior to the content reproduction.

For example, a BD-J application recorded in a disc is used for the process with the server.

For example, the BD-J application performs a process using an application programming interface (API).

As an example of the API, for example, there is an API for executing a process of reading a volume ID recorded in the disc (getVolumeID method).

For example, in a case where a specified reproduction application compatible with the BD-UHD-ROM is executed, it is necessary to perform a process of applying the API.

However, since the volume ID is not recorded in the BD-R or the BD-RE disc, the volume ID is unable to be read from the BD-R disc or the BD-RE disc even in a case where the API (getVolumeID method) is executed.

A configuration of preventing the reproduction process from being interrupted by the reading error is installed in the information processing device (reproducing device).

Specifically, a configuration in which, when the BD-R disc or the BD-RE disc is loaded, in a case where the API (getVolumeID method) is executed, a process of giving dummy data similar to the 16-byte volume ID specified in the API as dummy data which is specified in advance, for example, the following 16-byte dummy data to the reproduction application is performed is provided:

"0xFFFFFFFFFFFFFFFFFFFFFFFFFFFFFFFF."

With this process, it is possible to continue the reproduction process without interrupting the reproduction sequence.

Further, a setting in which the process to which such an API is applied is not performed may be performed.

(6) Others

As described above, the information disclosure device of the present disclosure is configured to decide the reading bit rate of the content recorded in the disc on the basis of the setting value of the disc type recorded in the index table.

Further, in the case of the single-zone type disc, the reading bit rate of the content recorded in disc is constant both in the inner circumference and the outer circumference, but in the case of the two-zone type disc, the process of switching the reading rate of the content recorded in the inner circumference of the disc and the reading rate of the content recorded in the outer circumference is performed.

Further, in the emulation mode, the bit rate conversion process described above with reference to FIG. 12 is executed as necessary to enable the reproduction process according to the bit rate necessary for the normal reproduction of the disc record content.

In the case of the two-zone type disc, the bit rate converting unit 310 described above with reference to FIG. 12 performs the process of changing the output rate from the smoothing buffer 312 when the content recorded in the inner circumference of the disc and the content recorded in the outer circumference are reproduced.

Further, for example, the information processing device may perform, control such that the number of revolutions of the disc is changed in accordance with a result of determining a necessary reading bit rate.

As described above, the data processing unit of the reproducing device that executes the data reproduction from the disc reads the disc type information recorded in the disc, detects the record data configuration of the disc on the basis of the read disc type information, and executes the data reading and reproduction processes in accordance with the reading rate corresponding to the detected record data configuration.

As described above, on the basis of the disc type information, in addition to the reading rate necessary for the normal reproduction, the information processing device can acquire the zone setting information indicating whether or not the disc is a single-zone type disc including a single reading rate zone or the disc is a multi-zone type disc including a plurality of different reading rate zones, the total recording capacity information, and the like.

The data processing unit of the reproducing device applies an algorithm decided by applying such information and executes the data reading and reproduction processes.

Specifically, in a case where the disc is a single-zone type disc including a single reading rate zone, the data reading and reproduction processes according to the same algorithm are executed on the entire zone of the disc.

Further, in a case where the disc is a multi-zone type disc including a plurality of different reading rate zones, the data reading and reproduction processes are executed by applying different algorithms in units of zones of the disc.

Further, the disc type information recorded in the index table also has an advantage even in a case where a content recording disc is manufactured.

The content is created by a content creation studio. The content creation studio creates content of various settings.

Specifically, content which is recordable using only the low reading rate zone, content which needs to be recorded using two zones of the low reading rate zone and the high reading rate zone, and the like are created.

The content creation studio decides any one of the types (1) to (8) of FIG. 1 in which recording is performed depending on the content, records the information as the disc type information of the index table described above with reference to FIG. 9, and provides the resulting data to a disc factory.

The disc factory can determine the disc type of the disc in which the content is recorded with reference to the index table included in the data received from the content creation studio.

The disc factory can decide and record the content recording form for the disc on the basis of the determination result.

Further, for example, when the reproduction test is performed on the record data, it is possible to know the configuration of the record data with reference to the disc type information of the index table and accurately perform the reproduction test for the record data.

Specifically, a data processing unit that executes data processing in a disc manufacturing device reads the disc type information included in the disc record information, decides the data recording form for the disc on the basis of the read disc type information, and executes the data recording process for the disc.

Further, when the record data reproduction test is performed on a manufactured disc, the data processing unit reads the disc type information of the index table recorded in the disc and executes the record data reproduction test according to the algorithm decided in accordance with the read disc type information.

In the reproduction test, it is possible to record data for BD-UHD-ROM disc recording in the BD-R disc or the BD-RE disc using the BD-R disc or the BD-RE disc and perform the reproduction test.

As the reproduction process, that is, the reproduction process according to the flowchart illustrated in FIGS. 7 and 11 is performed, it is possible to reproduce the UHD data for BD-UHD-ROM recording recorded in the BD-R disc or the BD-RE disc normally.

[7. Configuration Example of Information Processing Device]

Figure 13:
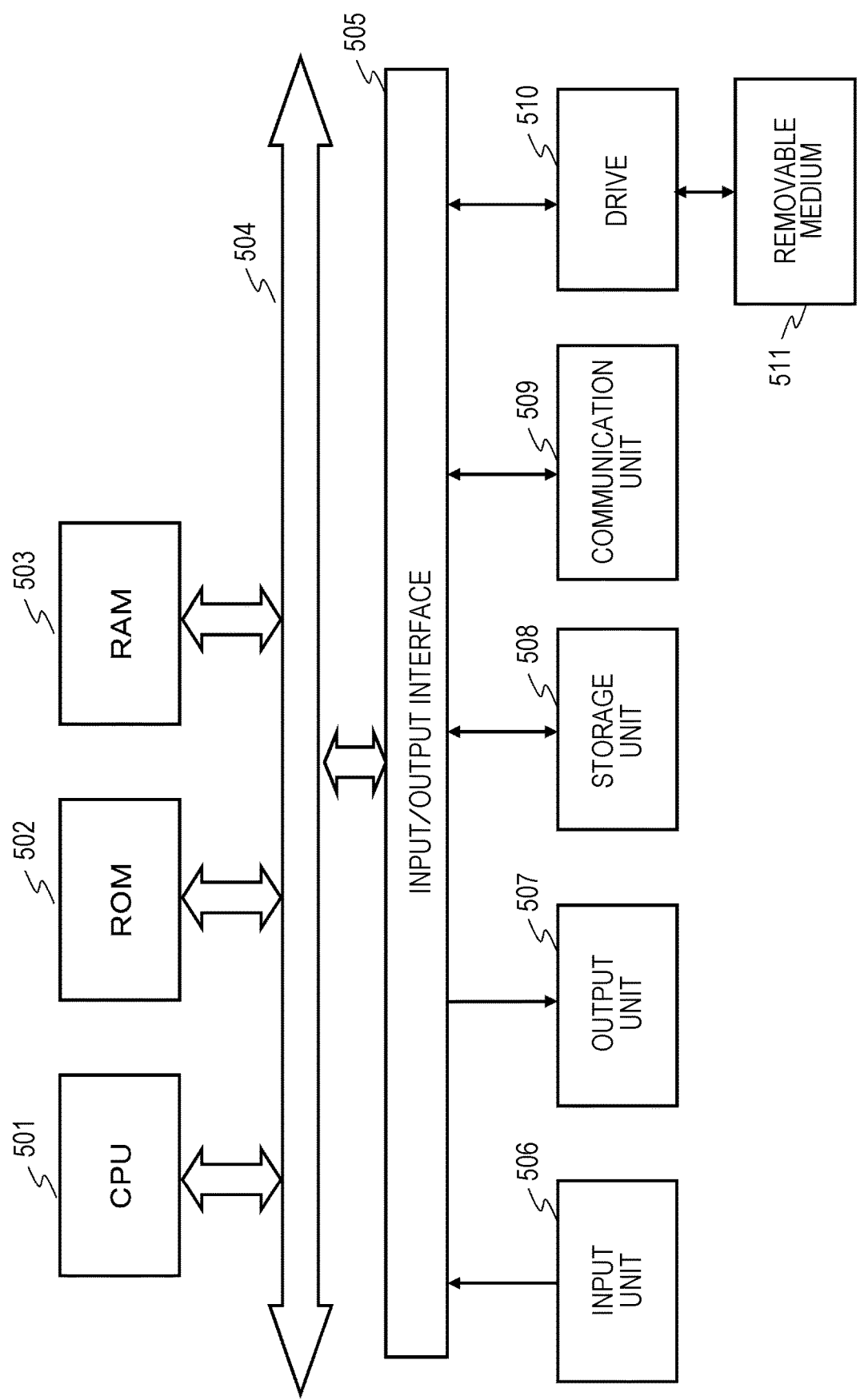
FIG. 13 is a diagram for describing a hardware configuration example of an information processing device applicable as a disc reproducing device, a recording device, or an information recording medium manufacturing device.

Next, a hardware configuration example of an information processing device which is applicable as a disc reproducing device, a disc recording device, or an information recording medium manufacturing device will be described above with reference to FIG. 13.

A central processing unit (CPU) 501 functions as a data processing unit that executes various kinds of processes in accordance with a program stored in a read only memory (ROM) 502 or a storage unit 508.

For example, the CPU 501 executes the process according to the sequence described in the above-described embodiment. A random access memory (RAM) 503 stores program executed by the CPU 501, data, and the like. The CPU 501, the ROM 502, and the RAM 503 are connected to one another via a bus 504.

The CPU 501 is connected to an input/output interface 505 via the bus 504, and an input unit 506 including various kinds of switches, a keyboard, a mouse, a microphone, and the like and an output unit 507 including a display, a speaker, and the like are connected to the input/output interface 505. The CPU 501 executes various kinds of processes in accordance with an instruction input from the input unit 506, and outputs a processing result to, for example, the output unit 507.

The storage unit 508 connected to the input/output interface 505 includes, for example, a hard disc or the like and stores a program executed by the CPU 501 and various kinds of data. A communication unit 509 functions as a transceiving unit for data communication performed via a network such as the Internet or a local area network, further functions as a transceiving unit for broadcast waves, and communicates with an external device.

A drive 510 connected to the input/output interface 505 drives a removable medium 511 such as a magnetic disc, an optical disc, a magneto-optical disc, a semiconductor memory such as a memory card, and executes recording or reading of data.

Further, the configuration described above with reference to FIG. 12 can be executed as a process of the CPU 501 as the data processing unit. The storage unit 508 can be used as the smoothing buffer.

Further, the configuration described above with reference to FIG. 12 may be provided as an independent dedicated hardware.

[8. Conclusion of Configuration of Present Disclosure]

The embodiment of the present disclosure has been described above in detail with reference to a specific example. However, it would be understood that those skilled in the art can make a modification or a substitution of the embodiment within the scope not departing from the gist of the present disclosure. In other words, the present invention has been disclosed in an example form and should not be interpreted restrictively. In order to determine the gist of the present disclosure, claims set forth below should be taken into consideration.

Further, the technology disclosed in this specification may have the following configurations:

(1) An information processing device, including:

a data processing unit that executes a reproduction process for disc record data, in which the data processing unit acquires a specified physical format compatible reading rate based on a physical format of a disc and a disc type compatible reading rate associated with disc type information recorded in the disc, the data processing unit stores data read from the disc at a rate according to the physical format compatible reading rate in a buffer and outputs the data from the buffer at a rate according to the disc type compatible reading rate in a case where the physical format compatible reading rate does not coincide with the disc type compatible reading rate, the data processing unit executes a reproduction process using the data output from the buffer.

(2) The information processing device according to (1), in which the data processing unit executes a process of identifying a physical format and a logical format of the disc, in a case where the physical format and the logical format are a combination which is specified in advance, the data processing unit executes a normal reproduction process, in a case where the physical format and the logical format are not a combination which is specified in advance, the data processing unit executes the reproduction process in an emulation mode which is not the normal reproduction process, and in the emulation mode, the data processing unit executes a process of comparing the physical format compatible reading rate with the disc type compatible reading rate.

(3) The information processing device according to (2), in which, in a case where the physical format of the disc is a physical format compatible with BD-R or BD-RE, and the logical format of the disc is a logical format compatible with BDMV-UHD for ultra high definition (UHD) image recording, the data processing unit executes the reproduction process in the emulation mode.

(4) The information processing device according to any of (1) to (3), in which, in a case where the physical format compatible reading rate coincides with the disc type compatible reading rate, the data processing unit executes the reproduction process using the data read from the disc with the rate according to the physical format compatible reading rate without executing rate conversion using the buffer.

(5) The information processing device according to any of (1) to (4), in which the data processing unit determines whether or not the disc is a multi-zone type disc in which different reading rates are set on the basis of the disc type information recorded in the disc.

(6) The information processing device according to any of (1) to (5), in which, in a case where the disc is determined to be the multi-zone type disc, the data processing unit changes a data output rate from the buffer in units of zones.

(7) The information processing device according to any of (1) to (6), in which the data processing unit acquires the disc type information from an index table recorded in the disc.

(8) The information processing device according to any of (1) to (7), in which the disc is a BD-R disc or a BD-RE disc recording data for BD-UHD-ROM recording which is a disc for ultra high definition (UHD) image recording, and the data processing unit executes a UHD content reproduction process from the BD-R disc or the BD-RE disc.

(9) The information processing device according to any of (1) to (8), in which the disc is a BD-R disc or a BD-RE disc recording non-encrypted data, and the data processing unit executes a non-encrypted content reproduction process from the BD-R disc or the BD-RE disc.

(10) An information processing method executed in an information processing device including a data processing unit that executes a reproduction process for disc record data, including:

acquiring, by the data processing unit, a specified physical format compatible reading rate based on a physical format of a disc and a disc type compatible reading rate associated with disc type information recorded in the disc;

storing, by the data processing unit, data read from the disc at a rate according to the physical format compatible reading rate in a buffer and outputting the data from the buffer at a rate according to the disc type compatible reading rate in a case where the physical format compatible reading rate does not coincide with the disc type compatible reading rate; and executing, by the data processing unit, a reproduction process using the data output from the buffer.

(11) A program causing information processing to be executed in an information processing device including a data processing unit that executes a reproduction process for disc record data, the program causing the data processing unit to execute:

acquiring a specified physical format compatible reading rate based on a physical format of a disc and a disc type compatible reading rate associated with disc type information recorded in the disc;

storing data read from the disc at a rate according to the physical format compatible reading rate in a buffer and outputting the data from the buffer at a rate according to the disc type compatible reading rate in a case where the physical format compatible reading rate does not coincide with the disc type compatible reading rate; and executing a reproduction process using the data output from the buffer.

Further, a series of processes described in the specification can be executed by hardware, software, or a combination thereof. In a case where a process is executed by software, a program having a processing sequence recorded therein may be installed in a memory in a computer incorporated into dedicated hardware and executed, or the program may be installed in a general-purpose computer capable of executing various kinds of processes and executed. For example, the program can be recorded in a recording medium in advance. In addition to installation of the program in a computer from a recording medium, the program may be received via a network such as a local area network (LAN) or the Internet and installed in a recording medium such as an internal hard disc.

Further, various kinds of processes described in the specification may be executed chronologically in accordance with the description or may be executed in parallel or individually in accordance with a processing capability of a device that executes a process or as necessary. Further, in this specification, a system refers to a logical aggregate configuration of a plurality of devices and not limited to a configuration in which devices of respective components are accommodated in the same housing.

INDUSTRIAL APPLICABILITY

As described above, according to one embodiment of the present disclosure, the data reproduction is performed in a mode decided on the basis of the disc type information which is the record data of the disc.

Specifically, for example, the reading rate compatible with the physical format of the disc is compared with the reading rate compatible with the disc type, and in a case where the reading rates do not coincide with each other, the data read from the disc at the physical format compatible rate is stored in the buffer, and the reproduction process is performed using the data output from the buffer at the disc type compatible rate. In a case where the physical format is BD-R or BD-RE, and the logical format is the logical format compatible with BDMV-UHD, the emulation mode reproduction accompanied with the rate conversion using the buffer is performed.

With this configuration, it is possible to perform the reproduction process to which the correct bit rate suitable for the disc type is applied on the basis of the disc type information which is the record data configuration information of the disc.

REFERENCE SIGNS LIST

111 Single rate zone
121 Low rate (LTR) zone
122 High rate (HTR) zone
200 Information recording medium (disc)
201 Management information setting section
2 02 Data section
301 Disc
302 Medium I/F
310 Bit rate converting unit (bit rate smoothing module)
311 Input/output control unit
312 Smoothing buffer
320 Reproduction processing unit
321 Decoder
322 Output unit
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing device, comprising:
a data processing unit that executes a reproduction process for disc record data,
wherein the data processing unit acquires a specified physical format compatible reading rate based on a physical format of a disc and a disc type compatible reading rate associated with disc type information recorded in the disc,
the data processing unit stores data read from the disc at a rate according to the physical format compatible reading rate in a buffer and outputs the data from the buffer at a rate according to the disc type compatible reading rate in a case where the physical format compatible reading rate does not coincide with the disc type compatible reading rate,
the data processing unit executes a reproduction process using the data output from the buffer,
the data processing unit executes a process of identifying a physical format and a logical format of the disc,
the data processing unit determines whether the physical format and the logical format of the disc are a combination which is specified in advance,
the data processing unit executes a normal reproduction process or the reproduction process in an emulation mode which is not the normal reproduction process, based on a result of the determination, and
the data processing unit is implemented via at least one processor.

2. The information processing device according to claim 1, wherein
in a case where the physical format and the logical format are a combination which is specified in advance, the data processing unit executes the normal reproduction process,
in a case where the physical format and the logical format are not a combination which is specified in advance, the data processing unit executes the reproduction process in the emulation mode, and
in the emulation mode, the data processing unit executes a process of comparing the physical format compatible reading rate with the disc type compatible reading rate.

3. The information processing device according to claim 2, wherein, in a case where the physical format of the disc is a physical format compatible with BD-R or BD-RE, and the logical format of the disc is a logical format compatible with BDMV-UHD for ultra high definition (UHD) image recording, the data processing unit executes the reproduction process in the emulation mode.

4. The information processing device according to claim 1, wherein, in a case where the physical format compatible reading rate coincides with the disc type compatible reading rate, the data processing unit executes the reproduction process using the data read from the disc with the rate according to the physical format compatible reading rate without executing rate conversion using the buffer.

5. The information processing device according to claim 1, wherein the data processing unit determines whether or not the disc is a multi-zone type disc in which different reading rates are set on the basis of the disc type information recorded in the disc.

6. The information processing device according to claim 1, wherein, in a case where the disc is determined to be a multi-zone type disc, the data processing unit changes a data output rate from the buffer in units of zones.

7. The information processing device according to claim 1, wherein the data processing unit acquires the disc type information from an index table recorded in the disc.

8. The information processing device according to claim 1, wherein the disc is a BD-R disc or a BD-RE disc recording data for BD-UHD-ROM recording which is a disc for ultra high definition (UHD) image recording, and
the data processing unit executes a UHD content reproduction process from the BD-R disc or the BD-RE disc.

9. The information processing device according to claim 1, wherein the disc is a BD-R disc or a BD-RE disc recording non-encrypted data, and
the data processing unit executes a non-encrypted content reproduction process from the BD-R disc or the BD-RE disc.

10. The information processing device according to claim 1, wherein in the emulation mode, the data processing unit executes a process of comparing the physical format compatible reading rate with the disc type compatible reading rate.

11. An information processing method executed in an information processing device including a data processing unit that executes a reproduction process for disc record data, comprising:
acquiring, by the data processing unit, a specified physical format compatible reading rate based on a physical format of a disc and a disc type compatible reading rate associated with disc type information recorded in the disc;
storing, by the data processing unit, data read from the disc at a rate according to the physical format compatible reading rate in a buffer and outputting the data from the buffer at a rate according to the disc type compatible reading rate in a case where the physical format compatible reading rate does not coincide with the disc type compatible reading rate;
executing, by the data processing unit, a reproduction process using the data output from the buffer;
executing, by the data processing unit, a process of identifying a physical format and a logical format of the disc;
determining, by the data processing unit, whether the physical format and the logical format of the disc are a combination which is specified in advance; and
executing, by the data processing unit, a normal reproduction process or the reproduction process in an emulation mode which is not the normal reproduction process, based on a result of the determination.

12. A non-transitory computer-readable medium having embodied thereon a program, which when executed by a computer causes the computer to execute a method, the method comprising:
acquiring a specified physical format compatible reading rate based on a physical format of a disc and a disc type compatible reading rate associated with disc type information recorded in the disc;
storing data read from the disc at a rate according to the physical format compatible reading rate in a buffer and outputting the data from the buffer at a rate according to the disc type compatible reading rate in a case where the physical format compatible reading rate does not coincide with the disc type compatible reading rate;
executing a reproduction process using the data output from the buffer;
executing a process of identifying a physical format and a logical format of the disc;
determining whether the physical format and the logical format of the disc are a combination which is specified in advance; and
executing a normal reproduction process or the reproduction process in an emulation mode which is not the normal reproduction process, based on a result of the determination.

* * * * *